(12) United States Patent
Popovich et al.

(10) Patent No.: US 8,885,112 B2
(45) Date of Patent: Nov. 11, 2014

(54) COMPACT HOLOGRAPHIC EDGE ILLUMINATED EYEGLASS DISPLAY

(75) Inventors: Milan Momcilo Popovich, Leicester (GB); Jonathan David Waldern, Los Altos Hills, CA (US)

(73) Assignee: SBG Labs, Inc. CA (US)

( * ) Notice: Subject to any disclaimer, the term of this patent is extended or adjusted under 35 U.S.C. 154(b) by 143 days.

(21) Appl. No.: 13/504,566

(22) PCT Filed: Oct. 26, 2010

(86) PCT No.: PCT/GB2010/001982
§ 371 (c)(1),
(2), (4) Date: Apr. 27, 2012

(87) PCT Pub. No.: WO2011/051660
PCT Pub. Date: May 5, 2011

(65) Prior Publication Data
US 2012/021881 A1 Aug. 30, 2012

Related U.S. Application Data

(60) Provisional application No. 61/272,734, filed on Oct. 27, 2009.

(51) Int. Cl.
*G02F 1/1335* (2006.01)
*G02B 27/01* (2006.01)
(Continued)

(52) U.S. Cl.
CPC ........ *G02B 27/0172* (2013.01); *G02F 2201/30* (2013.01); *G02F 1/134309* (2013.01);
(Continued)

(58) Field of Classification Search
CPC .. G02B 6/2931; G02B 6/29311; G02B 6/006; G02B 27/048; G02B 27/017; G02B 27/1086; G02B 27/01; G02B 5/203; G02B 5/1819; G02B 5/1842; G02B 5/265; G02B 2027/0174; G06F 1/13342; G06F 1/1334; G06F 2201/305; G06F 2201/346; G06F 2201/30; G06F 2201/307; G06F 2203/05; G06F 2203/055; G06F 2203/12; G06F 2001/133538; G03H 2250/38; G03H 2250/42; G03H 1/0408; G03H 2225/11; H04N 5/7491; G01J 3/18
USPC .......... 359/15, 254; 349/202, 86, 201, 10, 11; 385/37, 10; 348/E5.145, E13.041; 430/1, 20; 252/299.01; 345/7; 398/84, 398/87
See application file for complete search history.

(56) References Cited

U.S. PATENT DOCUMENTS 5,751,452 A 5/1998 Tanaka et al.
5,942,157 A 8/1999 Sutherland et al.
(Continued)

FOREIGN PATENT DOCUMENTS

JP 2002162598 6/2002
WO 2004102226 11/2004
WO 2009013597 1/2009

OTHER PUBLICATIONS

International Search Report for PCT/GB2010/001982, Completed by the European Patent Office on Feb. 24, 2011, 3 pages.

(Continued)

*Primary Examiner* — Thoi Duong
(74) *Attorney, Agent, or Firm* — Brooks Kushman, P.C.

(57) ABSTRACT

There is provided a wearable display comprising at least one Switchable Bragg Grating (SBG) device recorded in at least one Holographic Polymer Dispersed Liquid Crystal (HPDLC) layer. Each HPDLC layer is sandwiched between first and second transparent plates to which transparent electrodes have been applied. Each SBG device is characterized in that it provides a grating in a separate switchable region and is clear elsewhere. Each SBG device has a diffracting state and a non diffracting state. The transparent plates and HPDLC layers form a laminar structure which functions as a light guide. In one embodiment of the invention the display magnifies and forms a virtual image of information provided by an external image generator. In one embodiment of the invention the display and forms a virtual image of an image of information encoded in the SBG device.

14 Claims, 16 Drawing Sheets

(51) Int. Cl.
*G02B 5/18* (2006.01)
*G02B 5/20* (2006.01)
*G02F 1/1334* (2006.01)
*G02B 5/32* (2006.01)
*G02F 1/1343* (2006.01)
*F21V 8/00* (2006.01)
*G02F 1/137* (2006.01)
*G02F 1/1347* (2006.01)

(52) U.S. Cl.
CPC .... G02F 1/133615 (2013.01); *G02F 1/133621* (2013.01); *G02F 2203/12* (2013.01); *G02B 6/0028* (2013.01); G02B 5/1819 (2013.01); G02B 5/1842 (2013.01); G02B 5/203 (2013.01); *G02F 2001/13775* (2013.01); G02F 1/13342 (2013.01); G02B 27/017 (2013.01); *G02F 2201/123* (2013.01); *G02F 1/13473* (2013.01); *G02F 2203/62* (2013.01); *G02F 2201/307* (2013.01); G02B 5/32 (2013.01)

USPC .............................................. 349/11; 349/86

(56) References Cited

U.S. PATENT DOCUMENTS

| | | | |
|---|---|---|---|
| 6,052,540 | A | 4/2000 | Koyama |
| 6,504,629 | B1 | 1/2003 | Popovich et al. |
| 8,233,204 | B1 * | 7/2012 | Robbins et al. ................. 359/15 |
| 2006/0043938 | A1 | 3/2006 | O'Gorman et al. |
| 2006/0159864 | A1 | 7/2006 | Natarajan et al. |
| 2007/0041684 | A1 | 2/2007 | Popovich et al. |
| 2008/0001909 | A1 | 1/2008 | Lim |
| 2010/0202725 | A1 | 8/2010 | Popovich et al. |

OTHER PUBLICATIONS

Butler et al. J. Opt. Soc. Am. B. Feb. 2002, vol. 19, No. 2, p. 183-189, "Diffractive properties of highly birefringent volume gratings: investigation."

* cited by examiner

COMPACT HOLOGRAPHIC EDGE ILLUMINATED EYEGLASS DISPLAY

REFERENCE TO EARLIER APPLICATIONS

This application claims the priority of U.S. Provisional Patent Application No. 61/272,734 filed on 27 Oct. 2009 entitled COMPACT HOLOGRAPHIC EDGE ILLUMINATED EYEGLASS DISPLAY which is incorporated herein by reference in its entirety.

This application incorporates by reference in its entirety PCT Application US2008/001909, with International Filing Date: 22 Jul. 2008, entitled LASER ILLUMINATION DEVICE, U.S. patent application Ser. No. 10/555,661 filed 4 Nov. 2005 entitled SWITCHABLE VIEWFINDER DISPLAY and PCT Application No. US2006/043938, claiming priority to U.S. provisional patent application 60/789,595 filed on 6 Apr. 2006, entitled METHOD AND APPARATUS FOR PROVIDING A TRANSPARENT DISPLAY,

BACKGROUND OF THE INVENTION

This invention relates to a wearable display device, and more particularly to a wearable display using electrically switchable holographic optical elements.

There is a requirement for a compact see through data display capable of displaying image content ranging from symbols and alphanumeric arrays to high-resolution pixelated images. The display should be highly transparent and the displayed image content should be clearly visible when superimposed over a bright background scene. The display should provide full colour with an enhanced colour gamut for optimal data visibility and impact. A prime requirement is that the display should be as easy to wear, natural and non-distracting as possible with a form factor similar to that of ski goggles or, more desirably, sunglasses. The eye relief and pupil should be big enough to avoid image loss during head movement even for demanding military and sports activities. The image generator should be compact, solid state and have low power consumption.

The above goals are not achieved by current technology. Current wearable displays only manage to deliver see through, adequate pupils, eye relief and field of view and high brightness simultaneously at the expense of cumbersome form factors. In many cases weight is distributed in the worst possible place for a wearable display, in front of the eye. The most common approach to providing see through relies on reflective or diffractive visors illuminated off axis. Microdisplays, which provide high-resolution image generators in tiny flat panels, do not necessarily help with miniaturizing wearable displays because the requirement for very high magnifications inevitably results in large diameter optics. Several ultra low form factor designs offering spectacle-like form factors are currently available but usually require aggressive trade-offs against field of view, eye relief and exit pupil.

The optical design benefits of DOEs are well known including unique and efficient form factors and the ability to encode complex optical functions such as optical power and diffusion into thin layers. Bragg gratings (also commonly termed volume phase grating or holograms), which offer the highest diffraction efficiencies, have been widely used in devices such as Head Up Displays.

It is also known that diffractive optical elements can be used to provide virtual images for direct viewing or for viewing with the aid of optical systems. U.S. Pat. No. 6,052,540 by Koyama discloses a viewfinder device comprising a transmission hologram that can be located at a position other than in an image plane. The position of the virtual image formed by the transmission hologram is arranged to lie at the image plane of the optical system.

An important class of diffractive optical element known as an electrically Switchable Bragg Gratings (SBG) is based on recording Bragg gratings into a polymer dispersed liquid crystal (PDLC) mixture. Typically, SBG devices are fabricated by first placing a thin film of a mixture of photopolymerizable monomers and liquid crystal material between parallel glass plates. One or both glass plates support electrodes, typically transparent indium tin oxide films, for applying an electric field across the PDLC layer. A Bragg grating is then recorded by illuminating the liquid material with two mutually coherent laser beams, which interfere to form the desired grating structure. During the recording process, the monomers polymerize and the PDLC mixture undergoes a phase separation, creating regions densely populated by liquid crystal micro-droplets, interspersed with regions of clear polymer. The alternating liquid crystal-rich and liquid crystal-depleted regions form the fringe planes of the grating. The resulting Bragg grating can exhibit very high diffraction efficiency, which may be controlled by the magnitude of the electric field applied across the PDLC layer. In the absence of an applied electric field the SBG remains in its diffracting state. When an electric field is applied to the hologram via the electrodes, the natural orientation of the LC droplets is changed thus reducing the refractive index modulation of the fringes and causing the hologram diffraction efficiency to drop to very low levels. The diffraction efficiency of the device can be adjusted, by means of the applied voltage, over a continuous range from essentially zero to near 100%.

U.S. Pat. No. 5,942,157 by Sutherland et al. and U.S. Pat. No. 5,751,452 by Tanaka et al. describe monomer and liquid crystal material combinations suitable for fabricating SBG devices. A recent publication by Butler et al. ("Diffractive properties of highly birefringent volume gratings: investigation", Journal of the Optical Society of America B, Volume 19 No. 2, February 2002) describes analytical methods useful to design SBG devices and provides numerous references to prior publications describing the fabrication and application of SBG devices.

There is a requirement for a compact, lightweight wearable display providing a high brightness, high contrast information display with a large field of view, large exit pupil and a high degree of transparency to external light

SUMMARY OF THE INVENTION

The objects of the invention are achieved in a first embodiment in which there is provided a wearable display comprising a light-guide forming one transparent substrate of an HPDLC cell and a Diffractive Optical Element (DOE) forming the second transparent substrate. The two substrates together function as a light guide. The inside surfaces of each substrate are patterned with ITO to provide a set of SBGs. Each SBG device contains information encoded in a multiplicity of separately switchable grating regions. Said regions may be information symbols. Alternatively, the SBGs may be configured to provide two dimensional pixelated arrays. In each case the SBGs are confined to symbol or pixel regions, the display being perfectly transparent elsewhere. Guided light hitting a particular SBG region is diffracted towards the viewer and overlaid on the background scene while light missing the symbol undergoes TIR. Applying an electric field across a given symbol erases it from view. Said SBG and said DOE together form a magnified image of the symbols or pixels.

In a first embodiment of the invention the DOE is a transmission element.

In a second embodiment of the invention the DOE is a reflection element.

In a further embodiment of the invention there is provided a wearable display comprising a light-guide forming one transparent substrate of an HPDLC cell and a DOE forming the second substrate and further comprising a laser illuminator. The laser illuminator comprises red, green and blue laser sources, a beam combiner and expander, a means for minimizing laser speckle and a means for coupling illumination to the curved light guide.

In a further embodiment of the invention said second substrate is a curved transparent element with no optical power.

In a further embodiment of the invention, the wearable display is configured to provide symbols of different colors by arranging for different symbols to contain SBGs optimized for the required wavelengths and LEDs of appropriate spectral output.

In a yet further embodiment of the basic invention several SBG panels could be stacked such that by selectively switching different layers it is possible to present a range of different symbols at any specified point in the field of view.

In a yet further embodiment of the basic invention several SBG panels each design to operate a specific wavelength could be stacked such that by selectively switching different layers it is possible to present different colours at any specified point in the field of view.

In one particular embodiment of the invention there is provided a wearable display comprising first and second substrates sandwiching a HPDLC cell. A diffractive lens is applied to a first region of the outer surface of the first substrate. A diffractive mirror is applied to a second region of the outer surface of the first substrate. The two substrates together function as a light guide. The inside surfaces of each substrate are patterned with ITO to provide a set of SBGs. The outer surface of said first substrate faces the eye of the viewer of the display. Each SBG device contains information encoded in a multiplicity of separately switchable grating regions. Said regions may be information symbols. Alternatively, the SBGs may be configured to provide two dimensional pixelated arrays. In each case the SBGs are confined to symbol or pixel regions, the display being perfectly transparent elsewhere. Guided light hitting a particular SBG region is diffracted towards the viewer and overlaid on the background scene while light missing the symbol undergoes TIR. Applying an electric field across a given symbol erases it from view. Said SBG and said DOE together form a magnified image of the symbols or pixels.

In another particular embodiment of the invention there is provided a wearable display comprising first and second substrates sandwiching a HPDLC cell. The two substrates together function as a light guide. A first holographic mirror is applied to the outer surface of the first substrate. A quarter wave plate is disposed adjacent to the outer surface of the second substrate. A second holographic mirror is disposed adjacent to the quarter wave plate. The inside surfaces of each substrate are patterned with ITO to provide a set of SBGs. Each SBG device contains information encoded in a multiplicity of separately switchable grating regions. Said regions may be information symbols. Alternatively, the SBGs may be configured to provide two dimensional pixelated arrays. In each case the SBGs are confined to symbol or pixel regions, the display being perfectly transparent elsewhere. Guided light hitting a particular SBG region is diffracted towards the viewer and overlaid on the background scene while light missing the symbol undergoes TIR. Applying an electric field across a given symbol erases it from view. Said SBG and said DOE together form a magnified image of the symbols or pixels.

In any of the above embodiments the substrates sandwiching the HPDLC layer may be planar, curved or formed from a mosaic of planar or curved facets.

In a further embodiment of the invention there is provided a pixelated edge lit eyeglass display in which the SBG cells combine the functions of coupling light from the TIR path and imaging said light onto the retina. The eyeglass display comprises a two-dimensional array of independently addressable SBG cells where each SBG cell has a unique optical prescription designed such that input collimated light incident in a first direction is deflected into output collimated light propagating in a second direction towards the eye. The SBG layer is sandwiched between transparent substrates. The substrates and SBG array together form a light guide. ITO layers are applied to the opposing surfaces of the substrates with at least one ITO layer being patterned such that SBG elements may be switched selectively. Input light is scanned and modulated by a laser scanning systems and injected into the eyepiece where it performs TIR until diffracted out of the eyepiece towards the eye by a group of active SBG cells with. Portions of the field of view are sequentially imaged onto the retina by switching groups of SBGs in sequence and scanning rays with a predetermined range of incidence angles onto the SBG group while the SBG cells comprising the group are in their active state. The region of active SBG cells may comprise a rectangular area.

In one embodiment of the invention said group of SBG cells is provide by a rectangular sub array of SBG cells.

In one embodiment of the invention said group of SBG cells is provided by a sequence of SBG cells disposed along a row or column of SBG cells, said row or column being activated in a scrolling fashion.

In one embodiment of the invention an eyepiece according to the principles of the invention comprises an input SBG beam deflector and an SBG array device comprising a one-dimensional array of independently addressable SBG elements. The SBG beam deflector and the SBG array are separated by a PDLC region. The SBG beam deflector and the SBG array are formed in a single layer and sandwiched between transparent substrates. ITO layers are applied to the opposing surfaces of the substrates with at least one ITO layer being patterned such that elements of the SBG array may be switched selectively. The substrates and SBG devices together form a light guide. Each SBG array element has a unique optical prescription designed such that input collimated light incident in a first direction is diffracted into output collimated light propagating in a second direction towards the eye. In one embodiment of the invention a wearable display according to the principles of the invention comprises: a spatial light modulator; a means for collimating light emitted from each pixel of the SLM; first and second input SBG devices; and first and second output SBG devices. Each said SBG device is formed in a HPDLC layer sandwiched between first and second transparent plates. Each SBG device provides a grating in a separate switchable region and is clear elsewhere. Each grating has a diffracting state and a non diffracting state. The transparent plates and HPDLC layers form a laminar structure which functions as a light guide. The first input SBG device in its diffracting state deflects first wavelength collimated light from said SLM incident in a first angular range into first collimated light following a first TIR path inside the light guide. The second input SBG device in its diffracting state deflects the first wavelength collimated light from the SLM that is incident in a second angular range into second collimated light following a second TIR path inside the light guide. The first output SBG in its diffracting state deflects the first TIR path light out of said lightguide towards an external pupil providing a first field of view region. The second output SBG in its diffracting state deflects the second TIR path light out of the lightguide towards an external pupil of size and location determined by the light path geometry providing a second field of view region. The image is viewed through said pupil. Transparent electrodes are applied to the opposing faces of the first and second transparent plates sandwiching each HPDLC layer. At least one of said transparent electrodes is patterned such that the independently switchable transparent electrodes elements overlap the separately switchable grating regions.

In one embodiment of the invention the first input SBG device and first output SBG devices are in their diffracting states when the second input SBG device and the second output SBG devices are in their non-diffracting states.

In one embodiment of the invention the SBG device is in said non-diffracting state when an electric field is applied across the electrodes and switches to its diffracting state when the electric field is removed.

In one embodiment of the invention the first and second field of view regions substantially abut.

In one embodiment of the invention the first output SBG in its diffracting state deflects first TIR path light out of the lightguide in a first direction and the second output SBG in its diffracting state deflects second TIR path light out of the lightguide in a second direction parallel to said first direction.

In one embodiment of the invention the first output SBG in its diffracting state deflects first TIR path light out of the lightguide in a first direction and the second output SBG in its diffracting state deflects second TIR path light out of the lightguide in a third direction orthogonal to said first direction.

In one embodiment of the invention the first input SBG device and the first output SBG devices are in their diffracting states, the second input SBG device and the second output SBG devices are in their non-diffracting states when the SLM displays a first image. The second input SBG device and the second output SBG devices are in their diffracting states, the first input SBG device and the first output SBG devices are in their non-diffracting states when the SLM displays a second image.

In one embodiment of the invention the first input SBG device and the first output SBG devices are provided by a first HPDLC layer and the second input SBG device and the second output SBG devices are provided by a second HPDLC layer.

In one embodiment of the invention the first and second input SBG devices are disposed in a common HPDLC layer.

In one embodiment of the invention the first and second output SBG devices are disposed in a common HPDLC layer.

In one embodiment of the invention the SLM modulates light from a laser.

In one embodiment of the invention the SLM is illuminated by a laser and the wearable display further comprises a despeckler.

In one embodiment of the invention the wearable display further comprises: a means for collimating first wavelength light emitted from each pixel of the SLM; a third input SBG device; and a third output SBG device. The third input SBG device in its diffracting state deflects collimated light from said SLM incident in a third angular range into second collimated light following a third TIR path inside the light guide. The third output SBG in its diffracting state deflects the third TIR path light out of the lightguide towards the external pupil providing a third field of view region.

In one embodiment of the invention the wearable display further comprises: first and second second-wavelength-diffracting input SBG devices; and first and second second-wavelength-diffracting output SBG devices. The first input second-wavelength-diffracting SBG device in its diffracting state deflects second wavelength collimated light from the SLM incident in the first angular range into a first second-wavelength-light TIR path inside the light guide. The second input second-wavelength-diffracting SBG device in its diffracting state deflects second wavelength collimated light from the SLM incident within the second angular range into a second second-wavelength-light TIR path inside the light guide. The first output second-wavelength-diffracting SBG in its diffracting state deflects first second-wavelength-light TIR path light out of the lightguide towards the external pupil into the first field of view region. The second output second-wavelength-diffracting SBG in its diffracting state deflects the second second-wavelength-light TIR path light out of the lightguide towards the external pupil into the second field of view region.

A more complete understanding of the invention can be obtained by considering the following detailed description in conjunction with the accompanying drawings, wherein like index numerals indicate like parts. For purposes of clarity, details relating to technical material that is known in the technical fields related to the invention have not been described in detail.

DETAILED DESCRIPTION OF THE INVENTION

The invention will now be further described by way of example only with reference to the accompanying drawings.

It will apparent to those skilled in the art that the present invention may be practiced with some or all of the present invention as disclosed in the following description. For the purposes of explaining the invention well-known features of optical technology known to those skilled in the art of optical design and visual displays have been omitted or simplified in order not to obscure the basic principles of the invention.

Unless otherwise stated the term "on-axis" in relation to a ray or a beam direction refers to propagation parallel to an axis normal to the surfaces of the optical components described in relation to the invention. In the following description the terms light, ray, beam and direction may be used interchangeably and in association with each other to indicate the direction of propagation of light energy along rectilinear trajectories.

Parts of the following description will be presented using terminology commonly employed by those skilled in the art of optical design.

It should also be noted that in the following description of the invention repeated usage of the phrase "in one embodiment" does not necessarily refer to the same embodiment.

Figure 1:
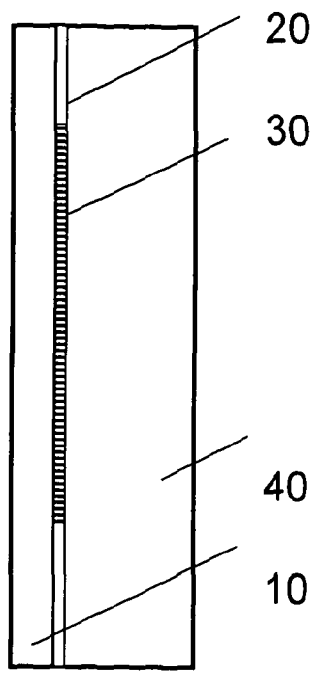
FIG. 1 is a schematic side elevation view of a portion of a wearable display in a first embodiment of the invention.

FIG. 1 shows a schematic side elevation view of a portion of one eyepiece of a wearable display according to the principles of the invention. Although a planar element is shown the complete eyepiece may have a curved or facetted surface. The portion of the display shown in FIG. 1 comprises a DOE 10 an HPDLC layer comprising flood cured region indicated by 20 surrounding at least one independently switchable SBG region indicated by 30 and a transparent substrate layer 40. The HPDLC layer is sandwiched between the substrate and the DOE. Said SBG regions may be information symbols. Alternatively, the SBG regions may be configured to provide two dimensional pixelated arrays. In each case the SBGs are confined to the symbol or pixel regions the display being perfectly transparent elsewhere. The SBG and DOE together encode the characteristics of a lens whose function will be explained below. A set of transparent electrodes, which are not shown, is applied to both of the inner surfaces of the substrates. The electrodes are configured such that the applied electric field will be perpendicular to the substrates. Typically, the planar electrode configuration requires low voltages, in the range of 2 to 4 volts per µm. The electrodes would typically be fabricated from Indium Tin Oxide (ITO). The light guide layer and DOE 10 and 40 together form a light guide. The grating region 30 of the SBG contains slanted fringes resulting from alternating liquid crystal rich regions and polymer rich (ie liquid crystal depleted) regions. In the OFF state with no electric field applied, the extraordinary axis of the liquid crystals generally aligns normal to the fringes. The grating thus exhibits high refractive index modulation and high diffraction efficiency for P-polarized light. When an electric field is applied to the SBG, the grating switches to the ON state wherein the extraordinary axes of the liquid crystal molecules align parallel to the applied field and hence perpendicular to the substrate. Note that the electric field due to the planar electrodes is perpendicular to the substrate. Hence in the ON state the grating exhibits lower refractive index modulation and lower diffraction efficiency for both S- and P-polarized light. Thus the grating region 12 no longer diffracts light towards the eye and hence no symbol is displayed. Each symbol is selectively controlled by an independent pair of planar electrodes. Typically, the electrode on one substrate surface is uniform and continuous, while electrodes on the opposing substrate surface are patterned to match the shapes of the said SBG regions. Desirably, the planar electrodes should be exactly aligned with the SBG regions for optimal switching of the SBG regions and the elimination of any image artifacts that may result from unswitched SBG regions.

Figure 2:
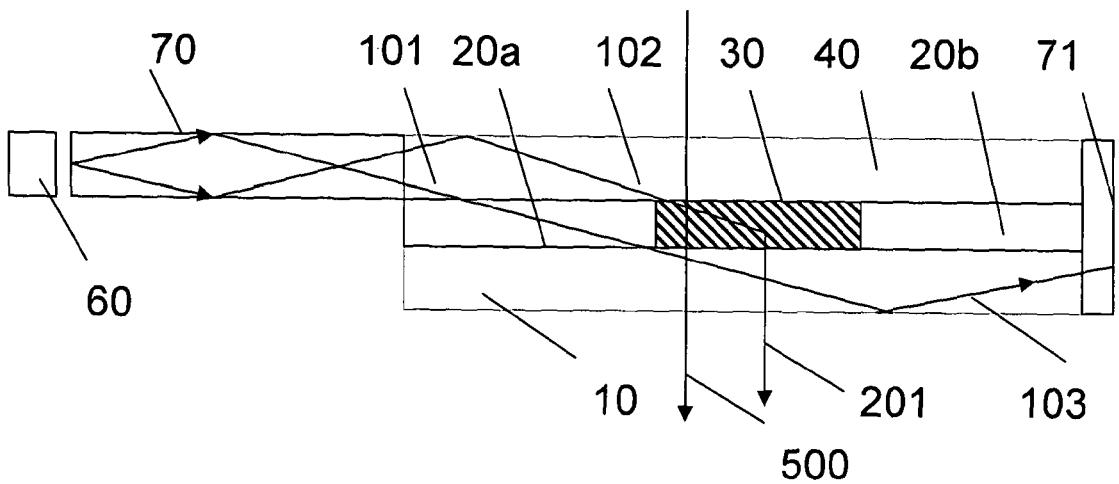
FIG. 2 is a schematic side elevation view of a portion of a wearable display in a first embodiment of the invention.

Turning now to FIG. 2 we consider the operation of the light guide in more detail. In FIG. 2 the display is again illustrated in a schematic side view. It will be seen that the display further comprises, an input lightguide 70, and beam stop 71. The SBG region sandwiched between the DOE and the second substrate comprises at least one grating region 30 and flood cured regions 20a, 20b on either side of the SBG grating region. The grating region has a first surface facing the viewer and a second face. The input lightguide 70 is optically coupled to the substrates 10 and 40 such the light from the LED undergoes total internal reflection inside the lightguide formed by 10 and 40. Light from the external scene, generally indicated as 500 propagates through the display towards the viewer. The propagation of light from the source through the display may be understood by considering the state when the SBG is diffracting, that is with no electric field applied. The rays 101 and 102 emanating from the light source 60 are guided initially by the input lightguide 70. The ray 102, which impinges on the second face of the grating region 30, is diffracted out of the display in the direction 201 towards the viewer. A virtual viewable image of the data holographically encoded in the SBG region is formed by the combined action of the SBG and the DOE. On the other hand, the rays 101 which do not impinge on the grating region 30 will hit the substrate-air interface at the critical angle and are totally internally reflected in the direction 103 and eventually collected at the beam stop 71 and out of the path of the incoming light 500.

Figure 3:
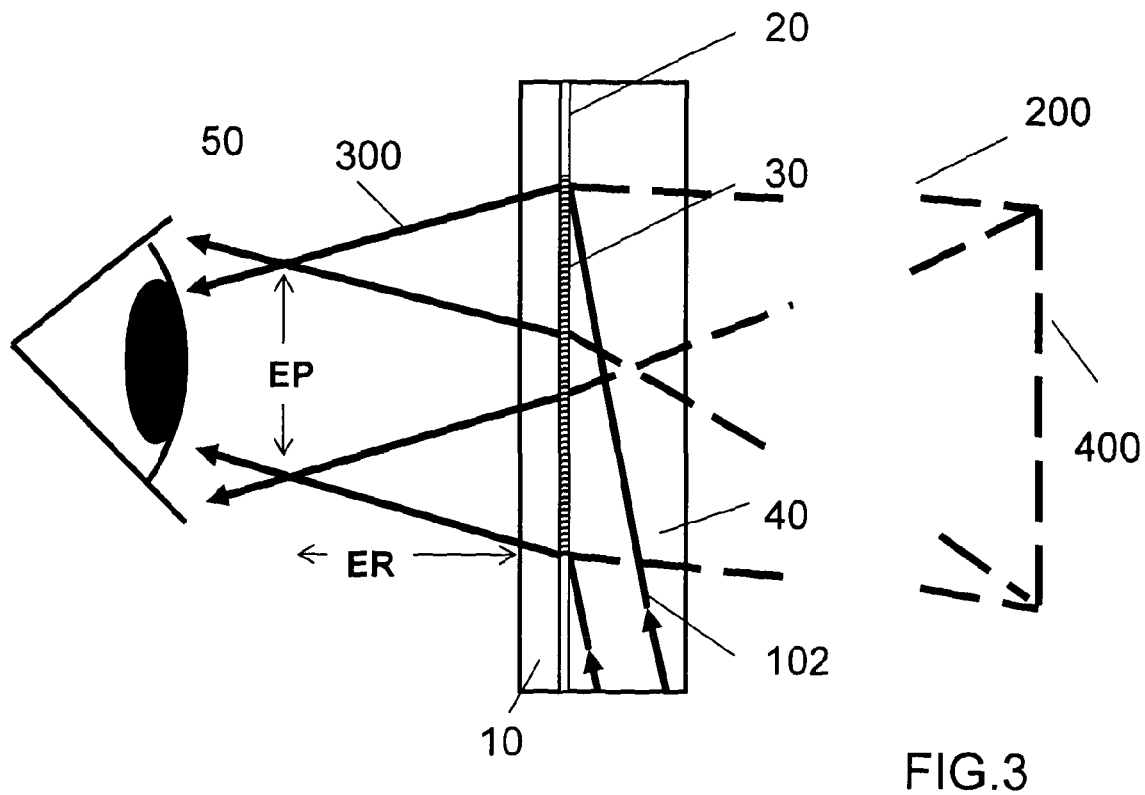
FIG. 3 is a schematic side elevation view of a portion of a wearable display in a first embodiment of the invention.

Referring now to FIG. 3 we consider the formation of the viewable image in more detail. The rays 102 which impinge on the SBG region 30 are diffracted towards the viewer. The SBG region corresponds to an off axis holographic lens which when illuminated by the off axis input rays 102 forms a virtual image 400 behind the display, ie on the opposite side of the display from the viewer. The virtual rays from the virtual image 400 are generally indicated by 200. The combined action of the SBG and the DOE forms an exit pupil indicated by EP at a distance from the display indicated by ER with the limiting rays being generally indicated by 300. It should be noted that the final image need not be at infinity. In certain cases a comfortably viewable image may be provided at a closer distance. Either the DOE or the SBG may have diffusing properties in addition to the basic lens characteristics recorded therein.

The DOE is designed to perform two functions. Firstly the DOE forms a virtual image at infinity in conjunction with the SBG. Secondly the DOE compensates for aberrations and distortions created by the SBG. The SBG and DOE together encode the optical prescription of a diverging aspheric off-axis lens. It should be noted that the DOE is designed to have minimal diffraction efficiency for ambient light transmitted through the display.

A DOE can be designed and fabricated for high diffraction efficiency for a single wavelength use using a classical Fresnel lens approach. A DOE may also be designed for operation with a discrete number of wavelengths, in which case the DOE is a multi-order or harmonic DOE. The master DOE element may be fabricated using conventional multi-level lithography to achieve optimum diffraction efficiency and replicated by plastic injection molding for mass production injection molding.

Figure 4:
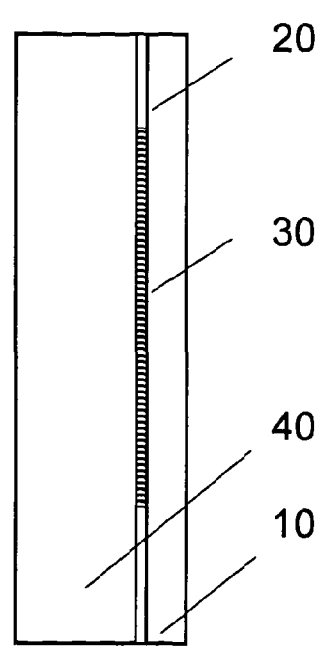
FIG. 4 is a schematic side elevation view of a portion of a wearable display in a second embodiment of the invention.
Figure 5:
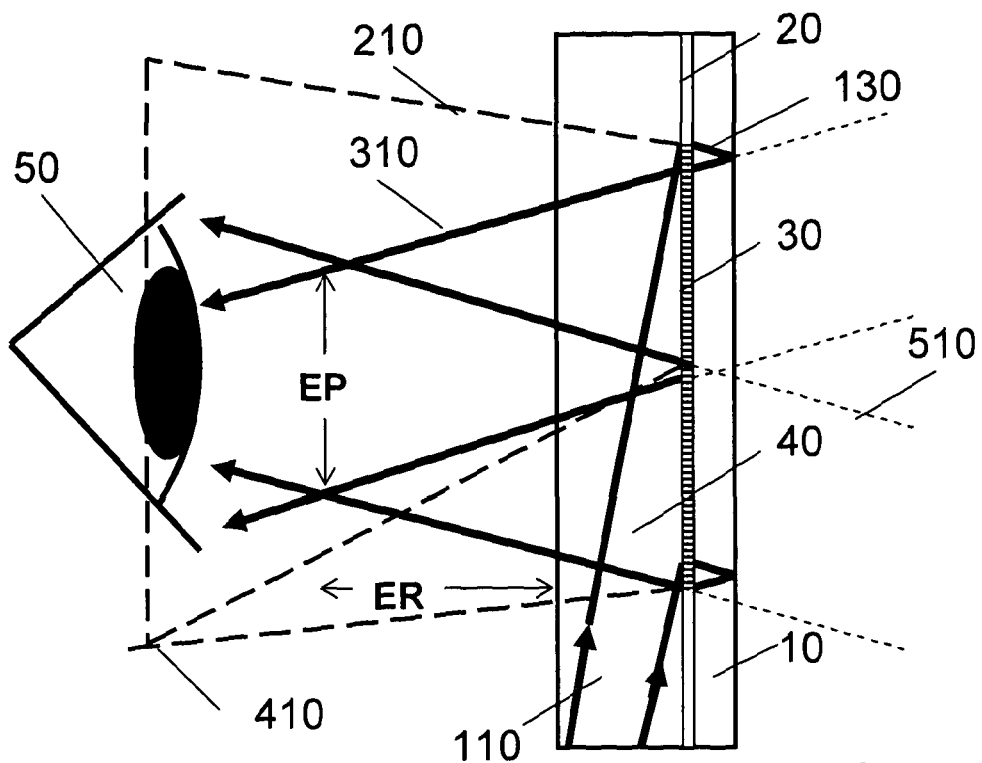
FIG. 5 is a schematic side elevation view of a portion of a wearable display in a second embodiment of the invention.

FIG. 4 shows a schematic side elevation view of a second embodiment of the invention. Again a portion of one eyepiece of a wearable display is illustrated. The display comprises a DOE mirror 11 an HPDLC layer 20 containing the SBG 30 and a substrate layer 41. The SBG encodes the characteristics of a lens. The DOE encodes the characteristics of a mirror. The HPDLC layer 20 is sandwiched between the substrate and the DOE. The substrate and DOE provide transparent substrates for the HPDLC layer. A set of transparent electrodes, which are not shown, is applied to both of the inner surfaces of the substrates. FIG. 5 is a schematic side elevation view of a portion of the display illustrating the formation of an image. The SBG deflects the incoming guided rays 110 to form a virtual image indicated by 410 located in front of the display. The reflective DOE then magnifies the virtual image 410 giving a final image at "infinity" indicated by the rays 510. The combined action of the SBG and the DOE forms an exit pupil indicated by EP at a distance from the display indicated by ER. The virtual ray paths from the virtual image 410 are generally indicated by 210, while the rays defining the pupil are generally indicated by 310. The final image need not be at infinity. In certain cases a comfortably viewable image may be provided at a closer distance. Either the DOE or the SBG may have diffusing properties in addition to the basic lens characteristics recorded therein. The advantage of the using a reflection DOE is that it causes less disturbance of ambient light due to the inherently narrow bandwidth of reflection gratings. Another advantage the embodiment of FIGS. 4-5 is that the reflection DOE may have substantial optical power. In optical design terms reflective DOEs provide more degrees of freedom for optimizing diffraction efficiency with respect to illumination light while minimizing the diffraction of external light. Advantageously, reflection DOEs can be optimized to provide high diffraction efficiency at low incidence angles.

Figure 6:
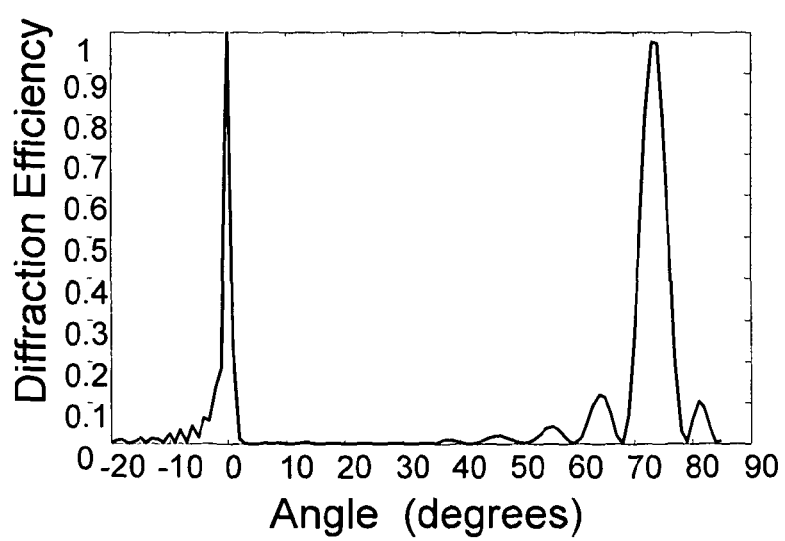
FIG. 6 is a chart illustrating the diffraction efficiency versus incident angle of an SBG in the state in which no electric field is applied to the SBG.
Figure 7:
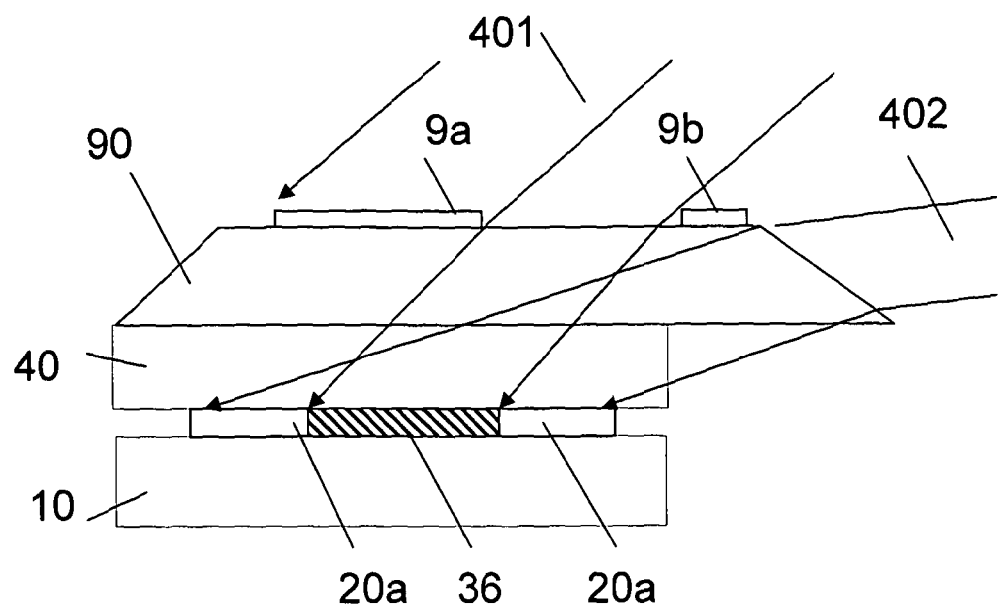
FIG. 7 is a schematic side view of the exposure system used to create the SBG.
Figure 8:
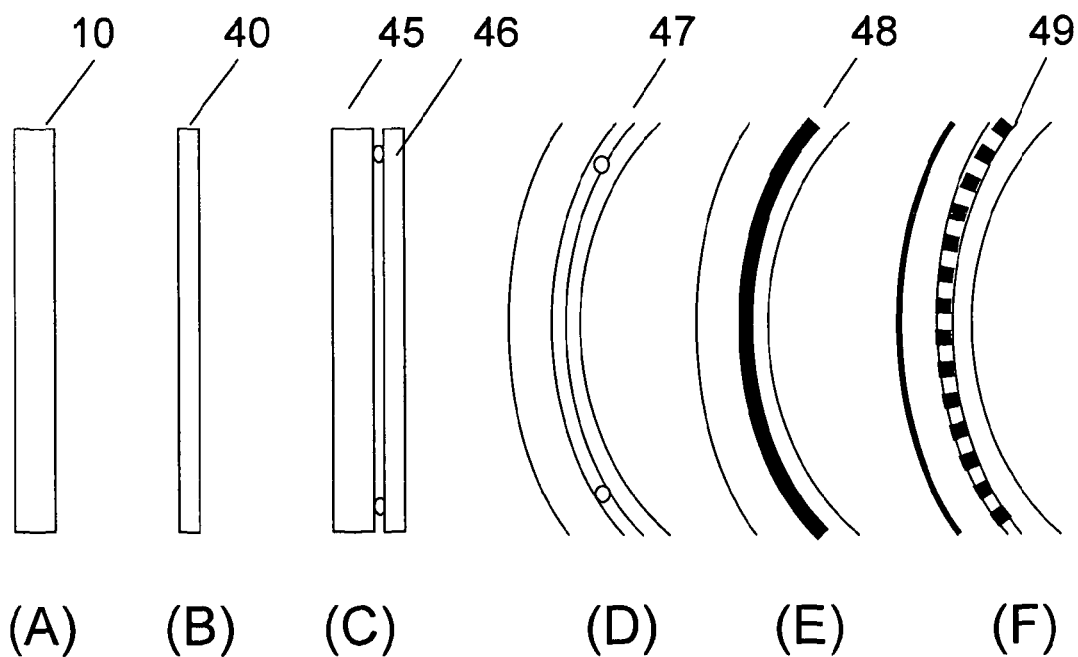
FIG. 8A is a side elevation view of a stage in the manufacture of a curved display element.
FIG. 8B is a side elevation view of a stage in the manufacture of a curved display element.
FIG. 8C is a side elevation view of a stage in the manufacture of a curved display element.
FIG. 8D is a side elevation view of a stage in the manufacture of a curved display element.
FIG. 8E is a side elevation view of a stage in the manufacture of a curved display element.
FIG. 8F is a side elevation view of a stage in the manufacture of a curved display element.

FIG. 6 is a chart illustrating the diffraction efficiency versus angle of an SBG grating in the OFF state. This particular grating has been optimized to diffract red light incident at around 72 degrees (the Bragg angle) with respect to the normal of the substrate. The Bragg angle is a function of the slant of the grating fringes and is chosen such that the diffracted light exits close to normal (0 degrees) to the substrate. To maximize the light throughput the light source and input lightguide should be configured such that light is launched into the lightguide at the Bragg angle. This can be accomplished by various means well known to those skilled in the art, including the use of lenses, gratings or prisms. Light launched into the lightguide must be at an angle greater than the angle for Total Internal Reflection (TIR) in order to be guided by the lightguide. Hence, the Bragg angle must be chosen to be larger than the angle for TIR. The invention is not restricted to particular method of introducing light into the lightguide.

In order to ensure high transparency to external light, high contrast of symbology (ie high diffraction efficiency) and very low haze due to scatter the following material characteristics are desirable. A low index-modulation residual grating, with a modulation not greater than 0.007, is desirable. This will require a good match between the refractive index of the polymer region and the ordinary index of the liquid crystal. The material should have a high index modulation capability with a refractive index modulation not less than 0.06. The material should exhibit very low haze for HPDLC cell thicknesses in the range 2-6 micron. The HPDLC should have a good index match (to within +0.015) for glass or plastic at 630 nm. One option is 1.515 (for example, 1737F or BK7 glasses). An alternative option would be 1.472 (for example Borofloat or 7740 Pyrex glasses).

FIG. 4 is a schematic side elevation view of a laser exposure system used to record the SBG grating. The exposure system comprises a prism 90 mount on top of and in optical contact with the substrate 40, a mask for defining the shapes of the symbols or pixels to be projected containing opaque regions such as 91a and 91b, and two mutually coherent intersecting laser beams generally indicated by 401 and 402. The prism has a top surface substantially parallel to the substrate and angle side faces. The beam 401 is introduced via the top surface of the prism. The beam 402 is introduced via a side face of the prism. The mask defines an aperture through which portions of the beams can impinge on the mixture of photo-polymerizable monomers and liquid crystal material confined between the parallel substrates 40 and 10. The interference of the beam within the region defined by the aperture creates a grating region 30 comprising alternating liquid crystal rich and polymer rich regions. The shape of the aperture defines the shape of the symbol or pixel array. It will be clear from consideration of FIG. 4 that a plurality of symbols may be created in this way. Referring again to FIG. 4 we see that the flood-cured regions 20a, 20b are created by the beam 402. Since there is no intensity variation in this region, no phase separation occurs and the region is homogeneous, haze-free and generally does not respond to applied electric fields. Advantageously the beam inside the light guide would have an incidence angle of 72 degrees corresponding to the Bragg angle of the SBG grating.

Desirably the light sources are solid-state lasers. An exemplary laser is the NECSEL developed by Novalux Inc. (CA). The NECSEL has several advantages including: better directionality than laser diodes; very narrow bandwidths and availability of red, green and blue devices. The low etendue of lasers results in considerable simplification of the optics. LEDs may also be used with the invention. However, LEDs suffer from large etendue, inefficient light collection and complex illuminator and projection optics. A further disadvantage with regard to SBGs is that LEDs are fundamentally unpolarized.

The laser power requirement will depend on the required symbol to background contrast. A typical requirement is around 50:1 contrast. In a typical practical monochromatic display embodiment we may assume: ambient illumination in bright daylight of $10^4$ lux; a display area of 5 cm$^2$; optical losses of 45%; and a luminous efficacy for green laser light of 680 lumens/W. Such a display would require approximately 850 mW of green laser power.

FIGS. 8A-8F illustrate the steps in manufacturing a curved eyepiece display of the type discussed above. Side elevation views of the eyepiece are shown in each case.

At step 1 a planar transparent substrate 10 is provided.
At step 2 a second planar transparent substrate 40 comprising a DOE is provided.
At step 3 said first and second substrates are combined in a cell 45 with spacers 46.
At step 4 the cell is mechanically deformed into a curved form 47.
At step 5 the cell 47 is filled with a HPDLC mixture 448
At step 6 an SBG 49 is recorded into the HPDLC mixture using two crossed mutually coherent laser beams.

Figure 9:
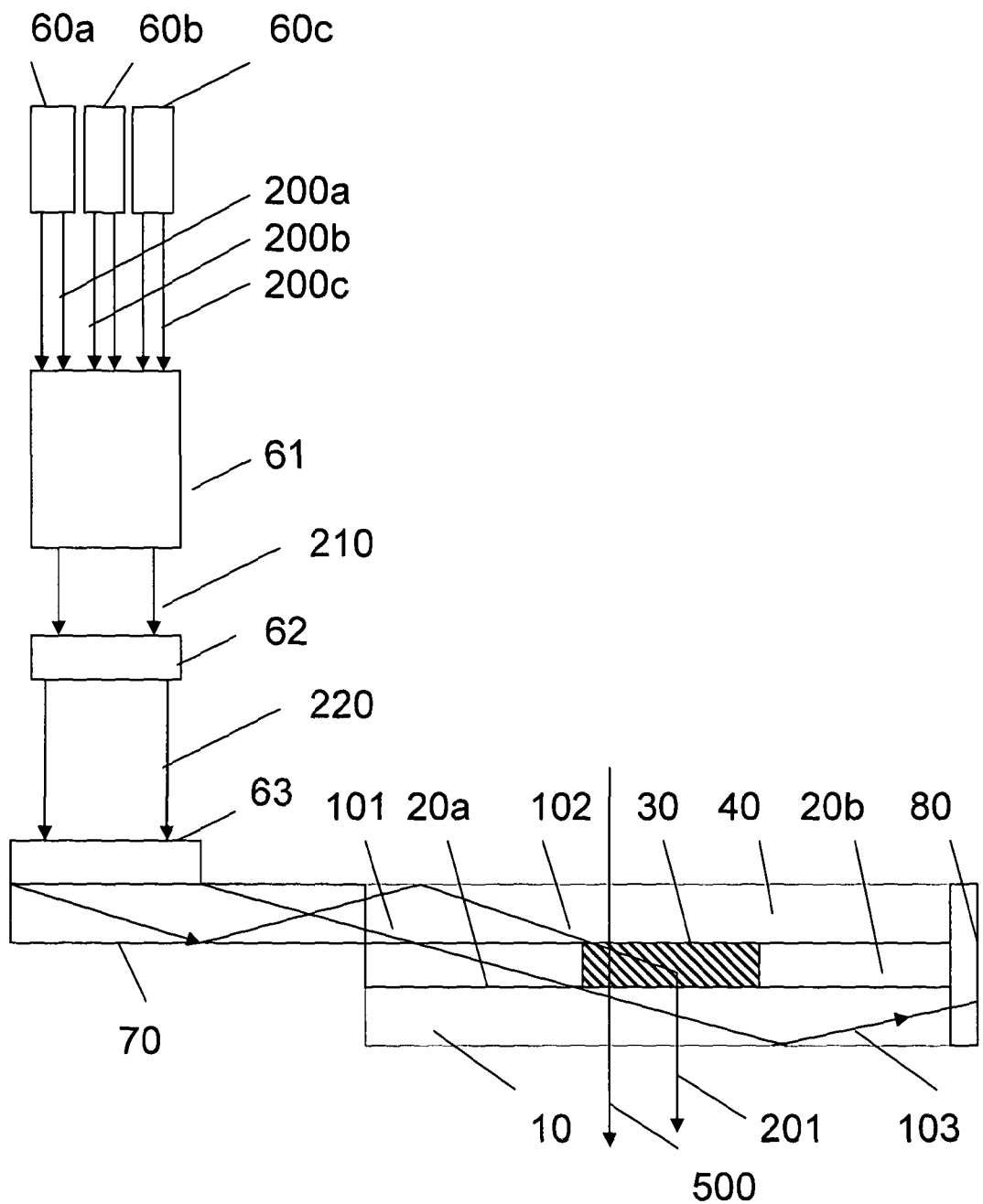
FIG. 9 is a schematic plan view of laser illuminated wearable display provided by another embodiment of the invention.

In a further embodiment of the invention a wearable laser illuminated display is provided. FIG. 9 shows a schematic side elevation view of a display incorporating the elements illustrated in FIG. 2 with the source 6 of FIG. 2 replaced by a laser illumination module. The illumination module comprises red green and blue lasers 610a,60b,60c a beam combiner and beam expander module 61, a despeckling device 62 and an optical means for coupling the laser light into the lightguide. The lasers emit red green and blue beams 200a, 200b,200c respectively. The beam combiner and expander combines beams 200a,200b,200c into to a single expanded beam 210. Speckle is a well-known problem in lasers displays. Speckle can be reduced by applying decorrelation procedures based on combining multiple sets of speckle patterns or cells from a given speckle-generating surface during the spatio-temporal resolution of the human eye. Desirably the despeckler 62 is an SBG device configured to generate set of unique speckle phase cells by operating on the angular or polarization characteristic of rays propagating through the SBG device. The SBG despeckler device may comprise more than one SBG layer. Furthermore, the SBG despeckler device may be configured in several different ways to operate on one of more of the phase, and ray angular characteristics of incoming light. In one implementation of the invention the SBG despeckler device may be configured as a diffuser. In another implementation of the invention the SBG despeckler device may be configured as a phase retarder based on a sub wavelength grating exhibiting form birefringence. Alternatively, the SBG despeckler device may be configured as a lens of the type known as an axicon. Varying the electric field applied across the SBG despeckler device varies the optical effect of the SBG despeckler device by changing the refractive index modulation of the grating. Said optical effect could be a change in phase or a change in beam intensity or a combination of both. The optical effect of the SBG despeckler device is varied from zero to maximum value at a high frequency by applying an electric field that varies in a corresponding varying fashion. Said variation may follow sinusoidal, triangular, rectangular or other types of regular waveforms. Alternatively, the waveform may have random characteristics. The SBG despeckler device may comprise similarly characterised first and second gratings disposed in series. Each incremental change in the applied voltage results in a unique speckle phase cell. A human eye observing the display integrates speckle patterns to provide a substantially de-speckled final image. The beam combiner 61 may comprise separate red green and blue SBG layers operated to diffract light from the red green and blue lasers sequentially into a common direction towards the despeckler.

The invention does not rely on any particular despeckler technology. Any method for generating and averaging speckle cells may be used with the invention. However, solid-state methods using SBGs or other electro-optical devices offer more scope for miniaturization of the illuminator module.

The optical design of a wearable display according to the principles of the invention will be dictated by basic geometrical considerations well known to those skilled in the art of optical design. The goal is to maximize eye relief, exit pupil and field of view. Since these parameters will impact on geometrical aberrations, dispersion and other factors affecting image quality some performance versus form factor trade-offs are inevitable. The preferred light source is a laser. If broadband sources such as LEDs are used the design will require careful attention to the correction of chromatic dispersion and monochromatic geometrical aberrations. Dispersion is a problem for any DOE illuminated by a broadband source. The degree of defocus or image blur due to dispersion depends on the source spectral bandwidth and the distance from the DOE to the virtual image plane. Typically, the angular blur for a given wavelength and a source spectral bandwidth will be of the order of the bandwidth divided by the wavelength. The effect of monochromatic geometrical aberrations will depend on the field of view and pupil size.

In preferred practical embodiments of the invention the display is configured as a layer that may be attached to a standard pair of glasses or goggles. In such embodiments the display is essentially a long clear strip appliqué running from left to right with a small illumination module continuing laser dies, lightguides and display drive chip tucked into the sidewall of the goggle. Only a standard index matched glue is needed to fix the display to the surface of the goggles.

Figure 10:
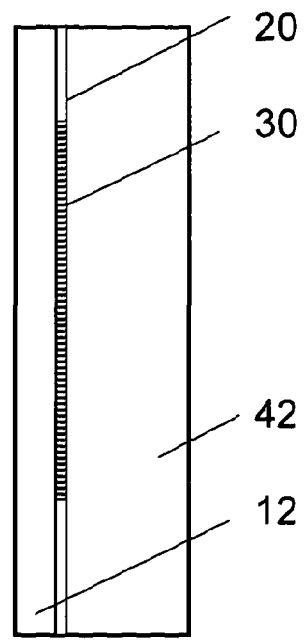
FIG. 10 is a schematic side elevation view of a portion of a wearable display in a further embodiment of the invention.
Figure 11:
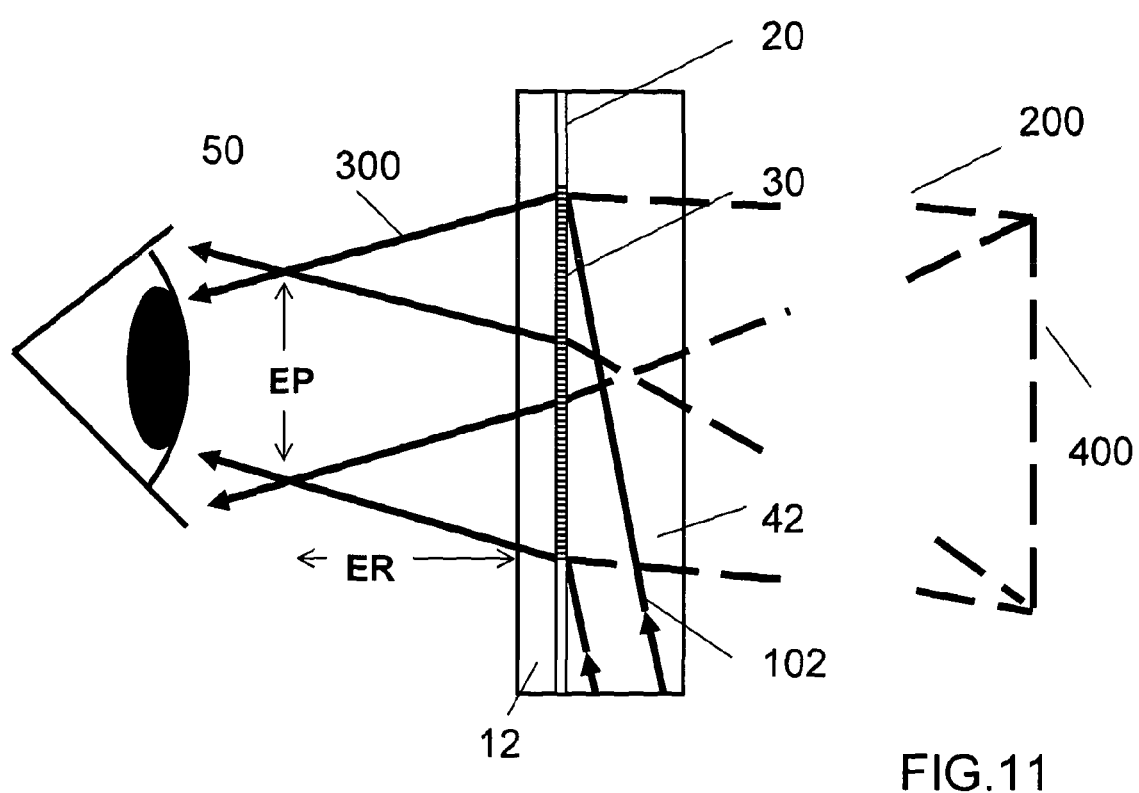
FIG. 11 is a schematic side elevation view of a portion of a wearable display in a further embodiment of the invention.

In a further embodiment of the invention illustrated in FIGS. 10-11 the DOE element is replaced by a transparent substrate without optical power. In FIGS. 10-11 the elements indicated by 12 and 42 are transparent substrates without optical power. In this embodiment the virtual viewable image is formed by the action of the SBG only. In all other respects the propagation of light through the display is the same as for the embodiment illustrated in FIGS. 1-3.

Figure 12:
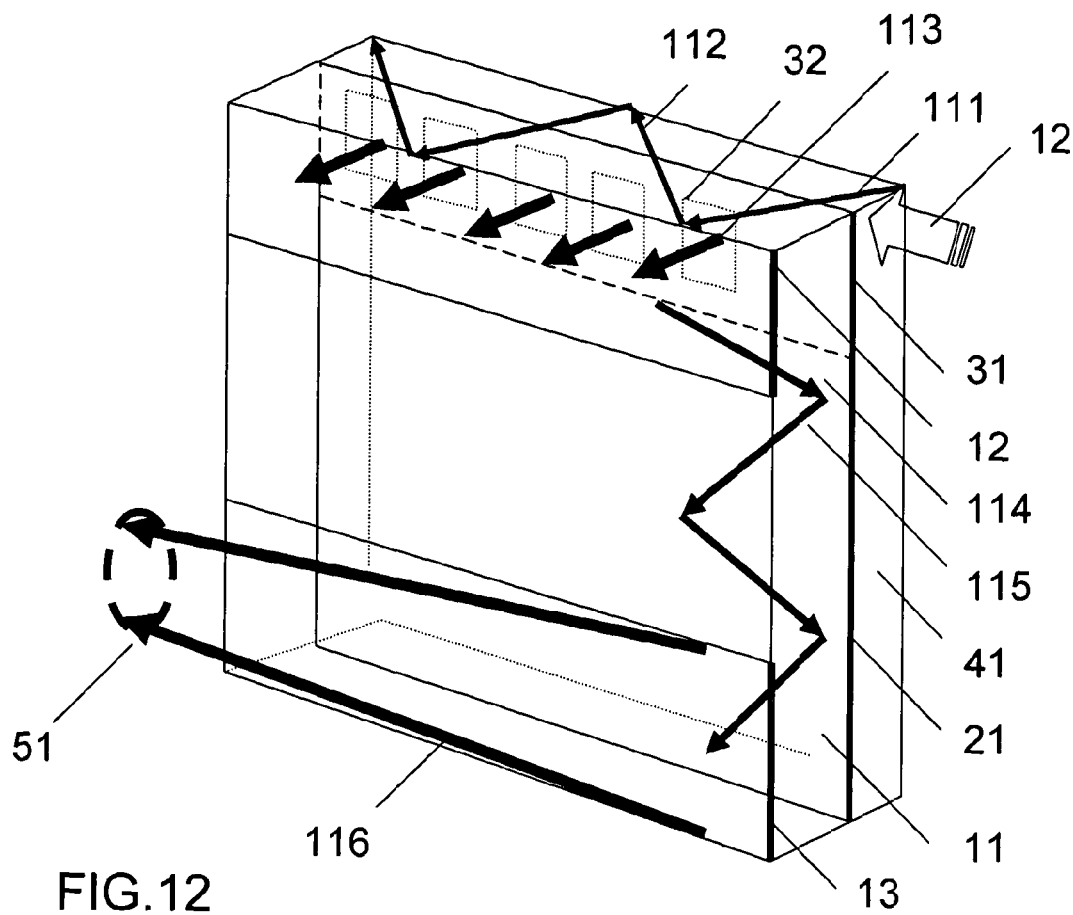
FIG. 12 is a schematic three-dimensional view of a particular embodiment of the invention.

FIG. 12 shows a schematic side elevation view of a portion of one eyepiece of a wearable display according to the principles of the invention. Although a planar element is shown the complete eyepiece may have a curved or facetted surface. The portion of the display shown in FIG. 12 comprises a first transparent parallel face substrate 11 an HPDLC layer comprising flood cured region indicated by 21 surrounding at least one independently switchable SBG region indicated by 31 and a second transparent parallel face substrate layer 41. The HPDLC layer is sandwiched between the two substrates. A diffractive mirror 12 is applied to a first region of the outer surface of the first substrate. A diffractive lens 13 is applied to a second region of the outer surface of the first substrate. For the purposes of explaining the invention said upper and lower regions may be assumed to correspond to the upper and lower portions of the inner surface of the eyepiece as viewed by a wearer of the display. Said SBG regions may be information symbols. Alternatively, the SBG regions may be configured to provide two dimensional pixelated arrays. In each case the SBGs are confined to the symbol or pixel regions the display being perfectly transparent elsewhere. The diffractive mirror and diffractive lens together encode the characteristics of a lens whose function will be explained below. A set of transparent electrodes, which are not shown, is applied to both of the inner surfaces of the substrates. The electrodes are configured such that the applied electric field will be perpendicular to the substrates. Typically, the planar electrode configuration requires low voltages, in the range of 2 to 4 volts per μm. The electrodes would typically be fabricated from Indium Tin Oxide (ITO). The substrates together form a light guide. The grating region 31 of the SBG contains slanted fringes resulting from alternating liquid crystal rich regions and polymer rich (ie liquid crystal depleted) regions. In the OFF state with no electric field applied, the extraordinary axis of the liquid crystals generally aligns normal to the fringes. The grating thus exhibits high refractive index modulation and high diffraction efficiency for P-polarized light. When an electric field is applied to the SBG, the grating switches to the ON state wherein the extraordinary axes of the liquid crystal molecules align parallel to the applied field and hence perpendicular to the substrate. Note that the electric field due to the planar electrodes is perpendicular to the substrate. Hence in the ON state the grating exhibits lower refractive index modulation and lower diffraction efficiency for both S- and P-polarized light. Thus the grating region 12 no longer diffracts light towards the eye and hence no symbol is displayed. Each symbol is selectively controlled by an independent pair of planar electrodes. Typically, the electrode on one substrate surface is uniform and continuous, while electrodes on the opposing substrate surface are patterned to match the shapes of the said SBG regions. Desirably, the planar electrodes should be exactly aligned with the SBG regions for optimal switching of the SBG regions and the elimination of any image artifacts that may result from unswitched SBG regions.

In the embodiment of FIG. 12 the SBG comprises an array of symbols. One such symbol is indicated by 32.

The formation of an image by the eyepiece may be understood by again referring to FIG. 12. The display is provided with input collimated light generally indicated by 110. The input light is admitted by light coupling optics similar to that illustrated in FIG. 2. The invention does not rely on any particular method of coupling input light into the eyepiece. For example, coupling optics based on components such as gratings, holograms, prisms, lens and others may be used. The input light propagates along a first TIR path within the light guide formed by the substrates as indicated by the rays 111, 112. It should be noted the TIR ray directions are parallel to plane normal to the substrate surfaces. The SBG symbols are configured to diffract light into the directions generally indicated by 113 when in their diffracting state. In certain embodiments of the invention only one symbol will be view at any particular time. In embodiments of the invention where more than one symbol is to be presented to the viewer the SBG symbols would be activated sequentially such that while only one symbol is active at any instant each symbol to be presented is active for a portion of the eye integration time. The light from the symbol 32 strikes the diffractive mirror 12 and is deflected into a second TIR path indicated by the rays 114,115. It should be noted that the first and second TIR paths are characterised by ray paths in orthogonal planes as indicated by FIG. 12. The rays in the second TIR path strike the diffractive lens and are deflected towards the viewer forming an exit pupil indicated by 51.

Optical power may be encoded into one or both of the diffractive lens and diffractive mirror. Each SBG symbol is designed to diffuse incident light into a cone around the diffracted ray direction. For example the SBG symbol 32 diffracts light into a cone around the diffracted ray direction 113. In certain embodiments of the invention it may be advantageous to provide said diffusion by first fabricating a computer generated hologram (CGH) having the required diffusion characteristics and then recording a hologram of said CCG into the SBG symbol. The CGH would typically be a surface relief diffractive optical element.

The diffractive mirror may be a Bragg grating, a switchable Bragg grating, a surface relief diffractive optical element, a computer generated hologram or a mirror formed using any other type of diffracting structure.

The diffractive lens may be a Bragg grating, a switchable Bragg grating, a surface relief diffractive optical element, a computer generated hologram or a lens formed using any other type of diffracting structure.

Figure 13:
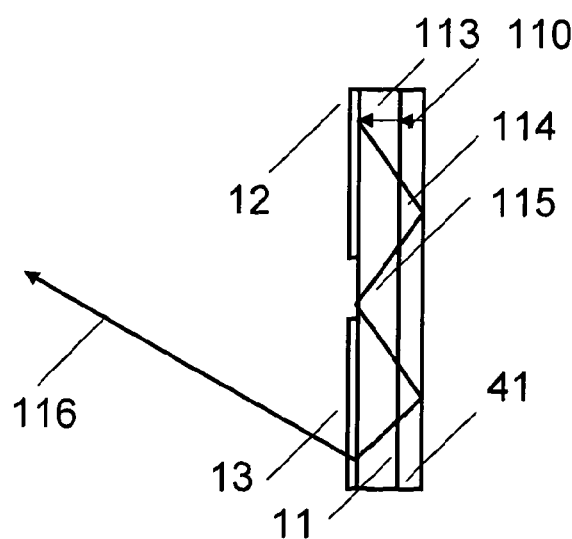
FIG. 13 is a schematic side elevation view of a particular embodiment of the invention.

FIG. 13 is a schematic side elevation view of the embodiment illustrated in FIG. 12 shown the second TIR path in more detail.

Figure 14:
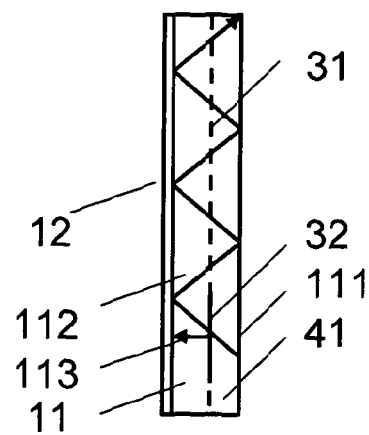
FIG. 14 is a schematic plan view of a particular embodiment of the invention.

FIG. 14 is a schematic side elevation view of the embodiment illustrated in FIG. 12 shown the first TIR path in more detail.

In the embodiment of FIG. 12 the SBG symbol diffracts light into an average direction substantially normal to the surface of the symbol towards the diffractive mirror. The diffractive mirror is dispose opposite the SBG symbols. Light in the first TIR path is not reflected in to the second TIR path by the diffractive mirror because the ray angles of the first TIR path are designed to fall outside the angular bandwidth within which the diffractive mirror provides efficient reflection. The rays of the first TIR path propagate through the diffractive mirror without deviation and undergo total internal reflection. On the other hand the rays from the first TIR path that are diffracted by SBG symbols fall within the angular bandwidth within which the diffractive mirror provides efficient reflection and are reflected into the second TIR path.

Figure 15:
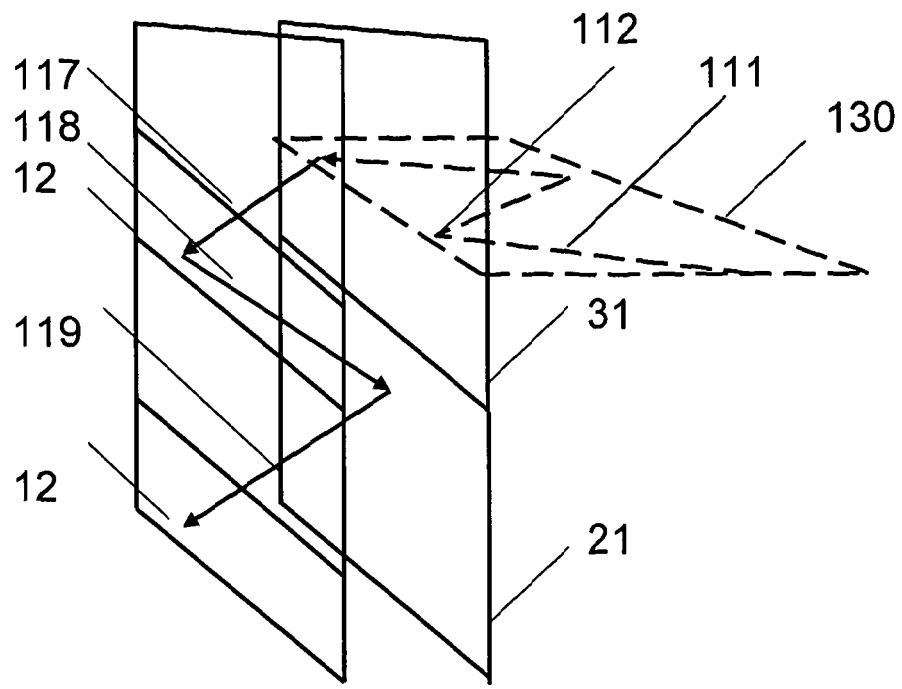
FIG. 15 is a schematic three-dimensional view of a detail of a particular embodiment of the invention.

In an alternative embodiment of the invention illustrate in the schematic three dimensional view of FIG. 15 the problem of interactions between the first TIR path and the diffractive mirror is avoided by disposing the mirror at a lower level than the SBG symbol array designing the SBG symbols to diffract light into a downward direction. The substrates are not illustrated in FIG. 15. Light in the first TIR path is characterised by the rays 111,112 propagating parallel to the plane 130 orthogonal to the plane of the SBG symbol array 31. The SBG symbols diffract light downwards in the direction 117 towards the diffractive mirror 12. The diffractive mirror reflects the light 117 into a second TIR path characterised by the rays 118,119. As in the embodiment of FIG. 12 the first and second TIR paths are orthogonal.

Figure 16:
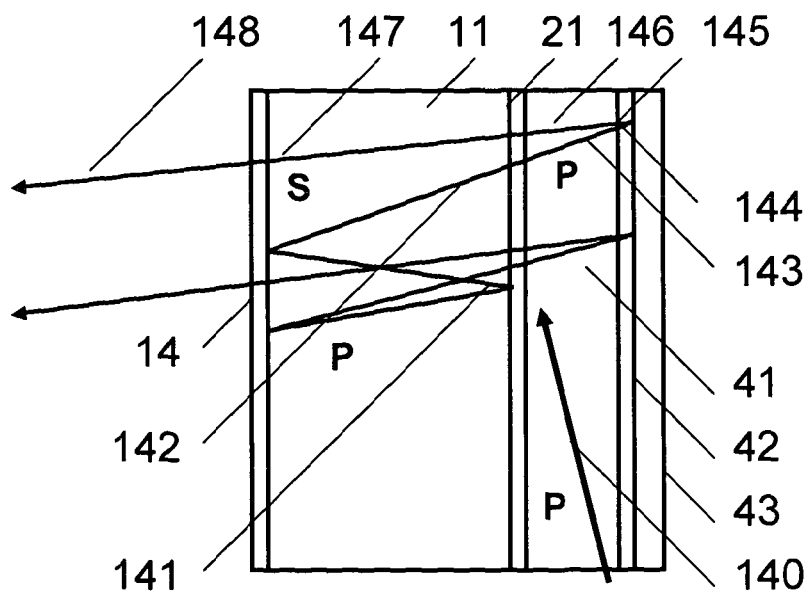
FIG. 16 is a schematic side elevation view of another embodiment of the invention.

FIG. 16 shows a schematic side elevation view of a portion of one eyepiece of a wearable display according to the principles of the invention. Although a planar element is shown the complete eyepiece may have a curved or facetted surface. The portion of the display shown in FIG. 16 comprises a first transparent parallel face substrate 11 an HPDLC layer comprising flood cured region indicated by 21 surrounding at least one independently switchable SBG region indicated by 31 and a second transparent parallel face substrate layer 41. The HPDLC layer is sandwiched between the two substrates. The substrates 11 and 41 form the walls of an SBG cell with the inside surfaces of each substrate being patterned with ITO electrodes to provide a set of SBG symbols.

A first holographic mirror 15 is applied to the outer surface of the first substrate. A quarter wave plate 42 is disposed in contact with the outer surface of the second substrate. A second holographic mirror 43 is disposed in contact with the quarter plate. At least one of the holographic mirrors has optical power such that a virtual image is formed behind the display ie on the opposite side to the eye.

Referring again to FIG. 16 we now consider the propagation of light through the display. Incident P polarized light 140 from one or more laser sources propagates within the light guide formed by the substrates. The exact configuration of the laser sources and the means for injecting laser light into the display does not form part of the present invention. The light 140 is diffracted and diffused by the SBG layer, which is sensitive to P-polarized light, forming a divergent beam generally indicated by 141. The SBG directs the light 141 towards the first holographic mirror. The first holographic mirror is designed to reflect P light in to the beam path generally indicated by 142. The first holographic mirror transmits the 1 S-polarised component of incident light. The reflected light 142 propagates back through the SBG. It should be noted that the reflected P-polarised light 142 avoids being diffracted by the SBG due to its incidence angle at the SBG falling outside the diffraction efficiency angular bandwidth of the SBG. According to the basic optics of gratings the angular bandwidth of the SBG is considerably smaller for rays that are incident substantially normal to the SBG, as will be the case for light reflected from the first holographic mirror. After passing through the SBG for a second time the light 142 is converted without substantially deviation into the light generally indicated by 143. The light 143 passes through the quarter wave plate retarder whereupon it is converted to circularly polarized light of a first sense 144 and then undergoes reflection at the second holographic mirror to provide the reflected light 145 which is circularly polarised in an opposing sense to the light 144. The holograph mirror shown in FIG. 16 has optical power resulting in collimation of the light 144. After passing through the quarter wave retarder for a second time the circularly polarised light 145 is converted into S polarised light generally indicated by 146. The S-polarised light 146 passes through the SBG without deviation as the light 147 since the SBG only diffracts P-polarized light. The S-polarised light is transmitted towards the viewer as the collimated light 148 by the first holographic mirror. Since the light is collimated the viewer is presented with a virtual image of the SBG symbols. Although the image is nominally at infinity the focal length of the second holographic mirror would be chosen to provide an image at some comfortable viewing distance of around 2-3 meters. In alternative embodiments of the invention the collimation may be provided by the first holographic mirror or by the first and second holographic mirrors in combination.

The embodiment of FIG. 16 relies on optimal polarization separation by the first holographic mirror to ensure that the P-polarised image light from the SBG symbols does not get through. An additional P-blocking polarizer may be disposed adjacent to the first holographic mirror to eliminate stray P-polarised light. It is known that holographic mirrors can be configured to be polarization sensitive. This property has been demonstrated in holographic mirrors recorded in dichromated gelatin (DCG) where Kogelnik theory predicts S/P separation is possible from the Brewster angle right up to around 85 degrees.

A wearable display based on any of the above-described embodiments may be implemented using plastic substrates. Using sufficiently thin substrates such embodiments could be implemented as a long clear strip appliqué running from the nasal to ear ends of each eyeglass with a small illumination module continuing laser dies, lightguides and display drive chip tucked into the sidewall of the eyeglass. A standard index matched glue would be used to fix the display to the surfaces of the eyeglasses.

Although the invention has been discussed in relation to wearable displays it will be clear from consideration of the drawings that the basic principles may be applied to other types of transparent displays such as viewfinders for DSLR cameras and Head Up Displays commonly used in aviation and automotive applications. The basic principles of the invention apply to displays of any size.

In applications such as DSLR viewfinders the SBG symbol array would typically be recorded using masked exposure processes. However, masked exposure may not be necessary in all applications. An advantage of avoiding masking processes is that the erasure of the SBG when it is not in its active state could be more complete. The inventors have found that the improved erasure results from the SBG being formed over a larger area with a lower degree of modulation of the grating.

In the above-described embodiments the SBG symbol is based on overlaying an ITO pad shaped in the form of a symbol over a correspondingly shaped SBG region into which Bragg grating with diffusing properties is recorded. Other methods of providing an SBG symbol may be used with the invention. For example the SBG may be of a more complex form comprising a grating formed by a wavefront encoding the characteristics of a symbol. An SBG symbol formed in this way may allow greater control over the characteristics of the viewable symbol. For example the diffusion characteristics may be controlled. In addition the SBG encoded optical characteristics that allow the image location, image magnification and image aberrations to be optimized. The SBG may be produced by first designing and fabricating a CGH with the required optical properties and then recording said CGH into the SBG.

In any of the above-described embodiments the SBG could be pixilated in the form of a two dimensional array. Such an SBG configuration would be appropriate for high information content displays.

The method of fabricating the SBG pixel elements and the ITO electrodes used in any of the above-described embodiments of the invention may be based on the process disclosed in the PCT Application No. US2006/043938, claiming priority to U.S. provisional patent application 60/789,595 filed on 6 Apr. 2006, entitled METHOD AND APPARATUS FOR PROVIDING A TRANSPARENT DISPLAY, which is incorporated herein in its entirety The transparent edge lit displays disclosed in the present application may employ features disclosed in U.S. patent application Ser. No. 10/555,661 filed 4 Nov. 2005, entitled SWITCHABLE VIEWFINDER DISPLAY which is incorporated herein in its entirety In any of the above embodiment of the invention, the SBG regions could be configured to provide symbols of different colors by arranging for different symbols or pixels to contain SBGs optimized for the required wavelengths and sources of appropriate spectral output.

In any of the above embodiment of the invention, of the basic invention several SBG layers could be stacked such that by selectively switching different layers it is possible to present different colours at any specified point in the field of view.

In any of the above embodiment of the invention, of the basic invention several SBG layers could be stacked such that by selectively switching different layers it is possible to present a range of different symbols at any specified point in the field of view.

Switched Array Pupil Expander Eyeglass Embodiment

The embodiments to be described in the following paragraphs there is provided a pixelated edge lit eyeglass display in which the SBG cells combine the functions of coupling light from the TIR path and imaging said light onto the retina. The eyeglass display comprises a two-dimensional array of independently addressable SBG cells where each SBG cell has a unique optical prescription designed such that input collimated light incident in a first direction is deflected into output collimated light propagating in a second direction towards the eye eliminating the need for a projection lens. The SBG layer is sandwiched between transparent substrates. The substrates and SBG array together form a light guide. ITO layers are applied to the opposing surfaces of the substrates with at least one ITO layer being patterned such that SBG elements may be switched selectively. Input light is scanned and modulated by a laser scanning systems and injected into the eyepiece where it performs TIR until diffracted out of the eyepiece towards the eye by a group of active SBG cells with. Portions of the field of view are sequentially imaged onto the retina by switching groups of SBGs in sequence and scanning rays with a predetermined range of incidence angles onto the SBG group while the SBG cells comprising the group are in their active state The region of active SBG cells may comprise a rectangular area.

In the embodiment of the invention illustrated in FIG. 15 an eyepiece according to the principles of the invention comprises a two-dimensional array of independently addressable SBG pixels. The device comprises an array of SBG elements 30 where each element encodes a predetermined typical function. The grating function may be defined in many different but to a first order may characterised by a grating spacing and a grating vector. Typically each SBG cell has a unique optical prescription designed such that input collimated light incident in a first direction is deflected into output collimated light propagating in a second direction towards the eye. The SBG layer is sandwiched between transparent substrates 10,40. ITO layers are applied to the opposing surfaces of the substrates with at least one ITO layer being patterned such that SBG elements may be switched selectively.

FIG. 16 provides a schematic illustration of the laser scanning system 1 in relation to the eyepiece of FIG. 15 which is illustrated in side elevation view. Light 300 from the laser module 2 is deflected in the X and Y directions by the deflector 3 controlled by the XY scan driver module 4. The light beams are modulated by an electro optical modulation device 5 to provide modulated scanned light beam with is injected into the eyepiece by means of an optical coupling element 72. The invention does not assume any particular type of laser. Desirably the laser comprises red green and blue emitters integrated in a compact module. The scanner is typically a miniature piezoelectric device. However any other type of compact scanning device may be used with the invention. The invention does assume any particular of modulator. Electronic circuitry for switching the SBG elements and supply power to them is also applied to the substrates. The invention does not rely on any particular method for implementing the electronics circuitry. The invention does not assume any particular method for coupling the scanned laser beam into the eyeglass. The substrates and the SBG layer together provide a light guide. Illumination light from external laser RGB source is coupled into the eyepiece and propagates under TIR in the Y direction as in indicated in the illustration. The input laser light is scanned and amplitude modulated to provide a range of ray angles such as 301,302,303 around a mean launch angle into the guide. It should be noted that the invention does not assume any particular scan pattern.

Turning again to FIG. 16 we see that at any instant groups of SBG cells such as the one indicated by 35 are activated, ie in their diffracting states, with all other cells generally indicated by 36 being inactive ie in their non-diffractive state. All SBG cells in the active group have substantially the same refractive index modulation. It will be clear from consideration of FIG. 15 that input light undergoes TIR until it impinges on an active SBG cell group. During the time the group is active the group is illuminated by collimated incident TIR light having a unique incidence angle. scan SBG cells in the active group diffract incident rays into a unique field direction as collimated light. For example rays incident at the SBG group in the directions 301,302,303 are diffracted into the directions 311,312,313. The eye focuses the collimated light onto the retina to form a discrete image cell. For example beams in the direction 311,312,313 are focused into beams 321,322,333 forming image points 331,332,33 on the retina.

Figure 17:
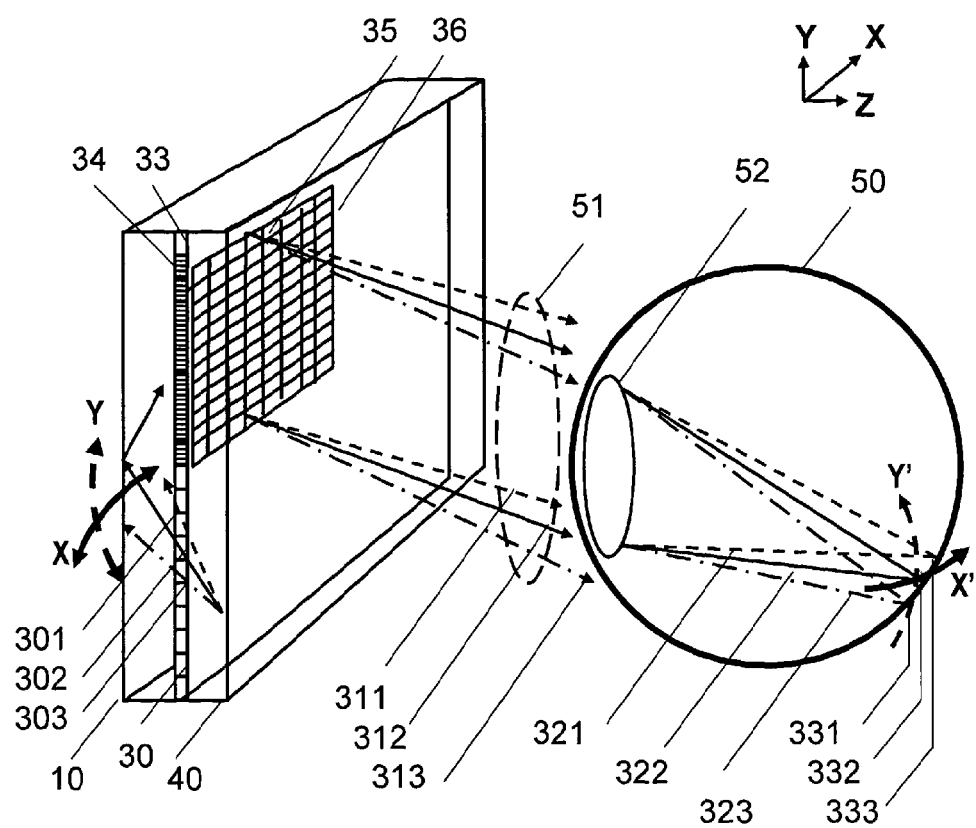
FIG. 17 is an illustration of another embodiment of the invention.
Figure 18:
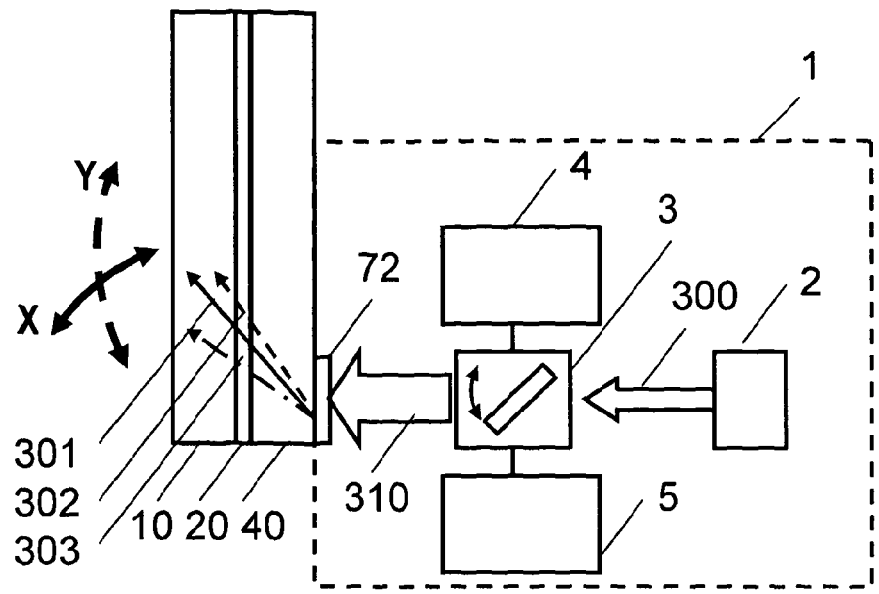
FIG. 18 is an illustration of another embodiment of the invention.
Figure 19:
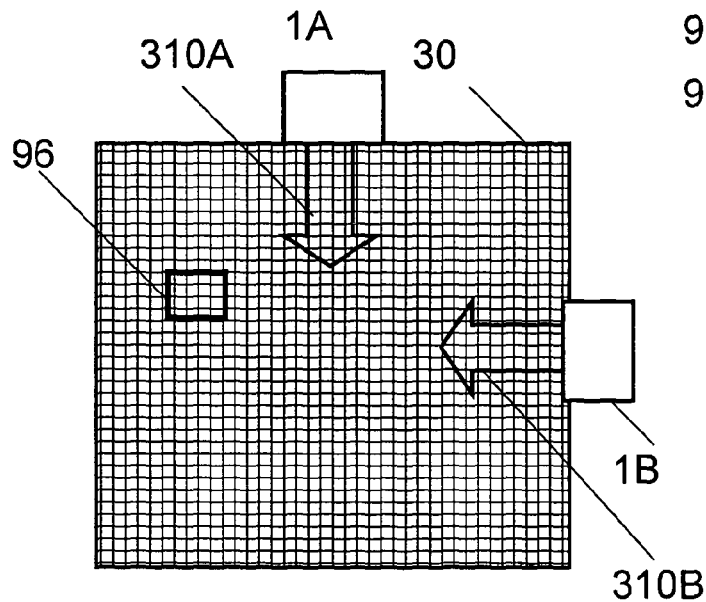
FIG. 19 is an illustration of another embodiment of the invention.
Figure 20:
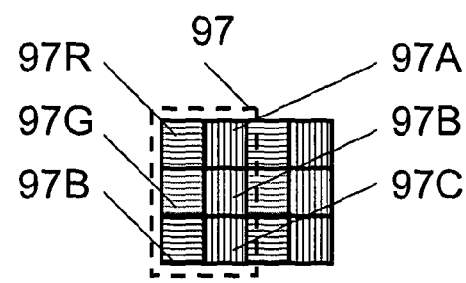
FIG. 20 is an illustration of another embodiment of the invention.

The SBG array architecture is illustrated in more detail in FIGS. 17-20. FIG. 17 illustrates one embodiment in which the SBG array 30 used with two scanning modules 1A,1B each similar in principle to module 1 in FIG. 16. Each scanning modules provides XY scanning according to the principles of FIG. 15 for TIR paths in the Y and X directions respectively indicated generally by 310A,310B. FIGS. 18-20 illustrated different SBG configurations that may be used to provide colour imaging In one embodiment of the invention illustrated in FIG. 18 the base set of SBG cells comprises the RGB diffract SBG cells 97R,97G,97B which are illuminated by TIR light in the direction 310A and the RGB diffracting SBG cells 97A,97B, 97C which are illuminated by TIR light in the direction 310B.

In one embodiment of the invention illustrated in FIG. 19 the base set of SBG cells comprises the RGB diffract SBG cell 98A which is illuminated by TIR light in the direction 310A and the RGB diffracting SBG cell 98B which is illuminated by TIR light in the direction 310B. In such an embodiment the RGB incidence angles must be selected such that in each case the peak wavelength and the incidence angle at the SBG satisfy the Bragg condition for the required output beam angle.

In one embodiment of the invention the base set may comprise a single SBG Cell designed to diffract RGB light and diffract light from laser scanning modules 1A and 1B.

In one embodiment of the invention only one RGB laser scanner module is provided.

In one embodiment of the invention only one RGB laser scanner module is provided with light being piped from scanning module 1A to an optical port located at the some other edge of the eyepiece.

In one embodiment of the invention separate up/down TIR paths may be to generate upper/lower image fields). The above light paths may be provided by separate external light pipes from the scanner/modulator. Alternatively, the upper and right edges of the eyepiece may incorporate reflectors.

It will be clear that other methods of combining SBG switching and laser scan based on the principles described above may be used with the present invention.

It will be clear from first order optical consideration that a large number of SBG cells must be active at any instant in order that the exit pupil is filled. To a rough approximation the size of the exit pupil should be of the order of the area of the active SBG cell group. Typically as much as 25% of the total available SBG cell population may need to be active at any time to ensure that the exit pupil is filled. At any instant in time all SBGs in a group have identical index modulation. Desirably the exit pupil is of the order of 8-10 mm in diameter. It will be clear that the number of groups, group geometry and the number of groups that can be activated during an image frame depends on the SBG switching time, the beam scanning pattern, TIR path limitations imposed by the range of incidence angles and the number of elements needed to fill the exit pupil. Typical SBG relaxation times are in the region of 500 microseconds. In one embodiment of the invention the array is divided into four quadrants which are switched sequentially during the field time.

It will be clear form consideration of basic diffraction theory that scanning the input light as described above allows greater image resolution than would be possible by simply illuminating an SBG array with a stationary light beam. The diffraction limited angular resolution cell size $\delta\theta$ of an SBG element is given by $\delta\theta=\lambda/d$ where is the wavelength and d is the aperture of a SBG cell. The display field of view FOV is given by: $FOV=2*a\ \tan(N*d/2*ER)$ where ER is the eye-relief and N is the number of SBG elements. Hence the number of resolvable pixels n is given by $n=FOV/\delta\theta$. For the number of resolvable pixels to match the number of SBG cells the value of d should be approximately $\sqrt{(\lambda.*ER)}$. If we assume WVGA resolution (480×800) and substitute the values ER=20 mm; $\lambda$=0.5 microns; and d=100 microns into the above equation the SBG array is: 48 mm×80 mm. This is too large for most practical eyeglass applications.

Another consequence of using a static illumination beam is that the beam cross section diffracted from an SBG cell would be far too small to fill the eye pupil. The present invention overcomes this problem by using simultaneously active groups of SBG cells to fill the pupil. In this sense the present invention provide what may be described as a pupil expander.

A second important benefit of combining the SBG array and a scanner is that SBG cells can be made big enough to overcome the above described diffraction limitations while keeping the overall array dimensions within acceptable form factor limits.

A third important benefit which results from being able to larger SBG cells is that the diffraction efficiency of the cell increases with the size of the cell due to the larger number of Bragg surfaces that interact with the incident light The SBG cells may have more sophisticated prescriptions than the basic beam-steering functions described above. For example SBGs may also encode aspect ratio shaping, focus control and other functions.

In one embodiment of the invention the SBG array could be replaced by an array of switchable thin gratings operating in the Raman Nath regime.

Advantageously, the SBG array fabricated using a diffractive optical mask formed on a transparent sapphire wafer. The SBG cell optical prescriptions are defined on a cell to cell basis. The process of fabricating the SBG array may start with the creation of a multiphase computer generated hologram encoding the desired optical functions which is then holographically recorded in the SBG.

In further embodiments of the invention each SBG cell may encode basic beam steering functions required to implement the above described embodiments together with additional optical functions including magnification, trapezoidal curved and beam shaping. In one embodiment of the invention the SBG array cells encode Fourier type SBG diffusers and beam shapers. In one embodiment of the invention the SBG array cells encode refractive microlenses recorded in ESBGs. In one embodiment of the invention the SBG array cells encode diffractive Fresnel lenses. In one embodiment of the invention the SBG array cells encode orthogonal cylindrical diffractive lenses recorded in recorded in ESBGs. In one embodiment of the invention the SBG array cells encode diffractive Fresnel computer generated holograms recorded into ESBGs.

Although image modulation is provided by the laser scanner in certain embodiment of the invention the SBG be used to modulate light in association with the laser scanner.

Any display device using lasers will tend to suffer from speckle. The present invention may incorporate any type of despeckler. Advantageously, the despeckler would be based on electro-optical principles. The present invention may incorporate a despeckler based on the principles disclosed in the PCT Application US2008/001909, with International Filing Date: 22 Jul. 2008, entitled LASER ILLUMINATION DEVICE., which is incorporated herein in its entirety. The need for a despeckler may be eliminated by using a miniature, broadband (4 nm) RGB lasers of the type supplied by Epicrystal Inc.

Scrolling Pupil Expander Eyeglass Embodiment

Another embodiment of the invention directed at providing an eyeglass combining an SBG array with a laser optical scanner within a thin edge illuminated eye-piece will now be described.

Figure 22:
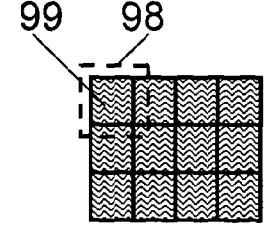
FIG. 22 is an illustration of another embodiment of the invention.
Figure 23:
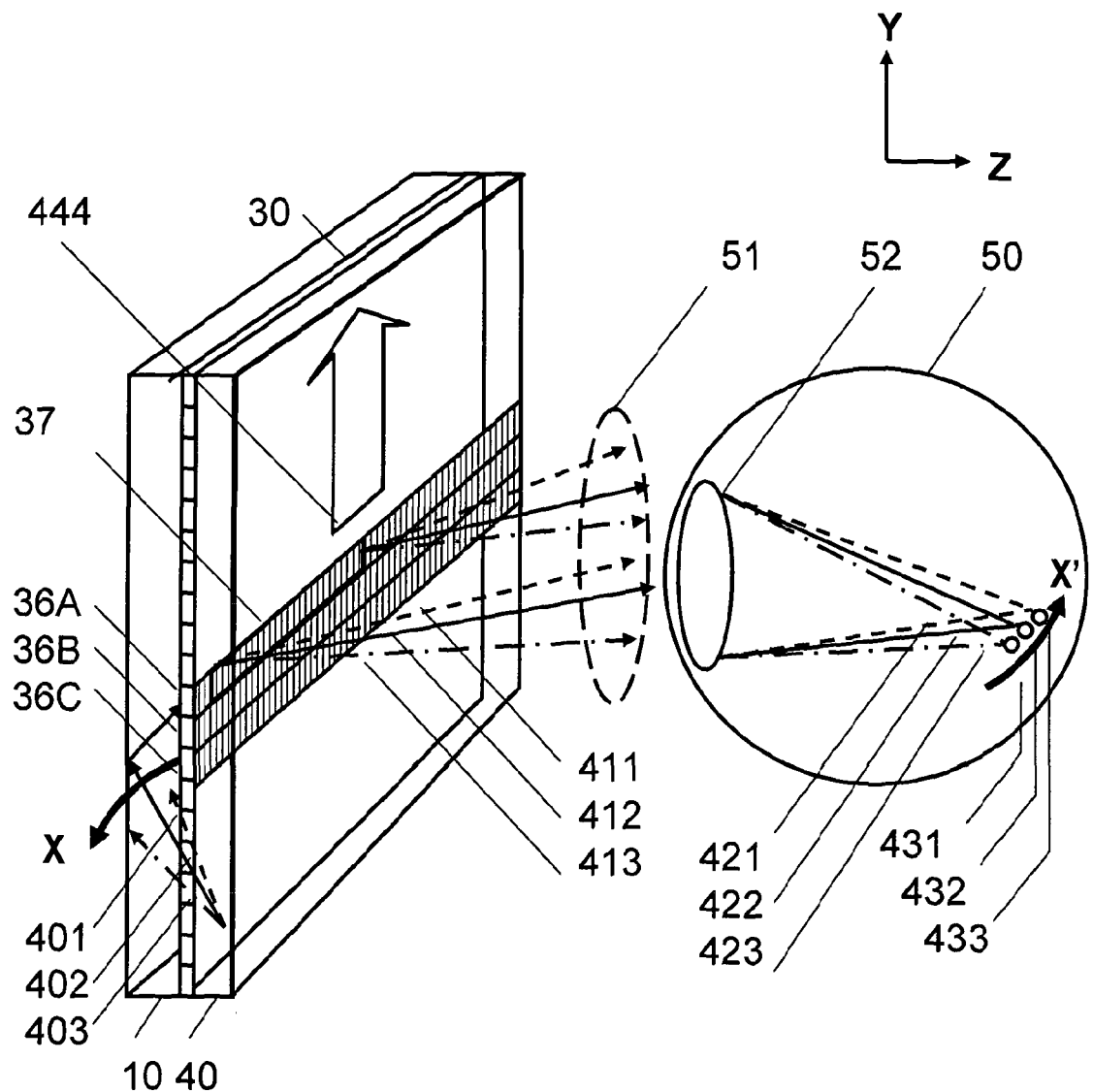
FIG. 23 is an illustration of another embodiment of the invention.
Figure 24:
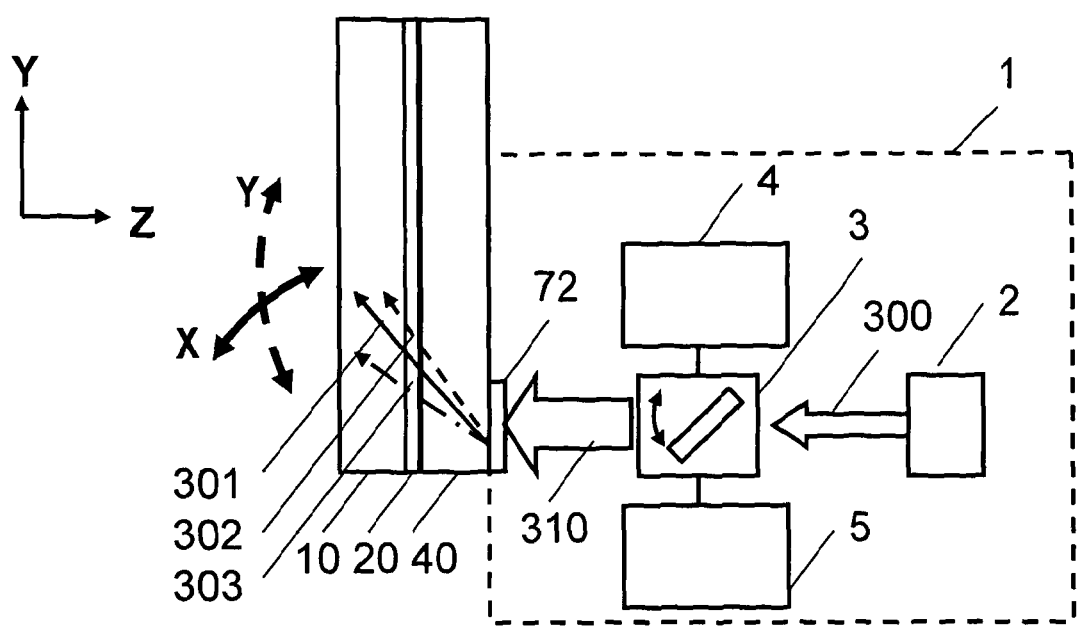
FIG. 24 is an illustration of another embodiment of the invention.

In an embodiment of the invention illustrated in FIG. 23 an eyepiece according to the principles of the invention comprises a two-dimensional array of independently addressable SBG pixels. The device comprises an array of SBG elements each having a predetermined grating function. The SBG layer is sandwiched between transparent substrates 10,40. ITO layers are applied to the opposing surfaces of the substrates with at leas one ITO layer being patterned such that SBG elements may be switched selectively. FIG. 24 provides a schematic illustration of the scanning system using in the embodiment of FIG. 23. The scanning system is similar the one of FIG. 16 except that in FIG. 22 the scanning is in the X-direction only, that is in the XZ plane.

The substrates and the SBG layer together provide a light guide. Illumination light from external laser RGB source is coupled into the eyepiece and propagates in the Y direction illustrated in the figure. The input laser light is scanned and amplitude modulated to provide a range of ray angles such as 401,402,403 around a mean launch angle into the guide. Rows of SBGs switched sequentially in the Y direction as indicated by 36A,36B,36C.

The principles of the embodiment of FIG. 23 consider row may be considering the SBG row 36A. The group of SBG cells indicated by 37 are activated, ie in their diffracting states, with all other cells being inactive ie in their non-diffractive state. Each cell in the active group has the same modulation. It will be clear form consideration of FIG. 17 that input light undergoes TIR until it impinges on an active SBG. During the time the group is active the group is illuminated by collimated incident TIR light having a unique incidence angle. SBG cells in the active group diffract incident rays into a unique field direction as collimated light. For example rays incident at the SBG group in the directions 401,402,403 are diffracted into the directions 411,412,413. The eye focuses the collimated light onto the retina to form a discrete image cell. For example beams in the direction 411,412,413 are focused into beams 421,422,433 forming image points 431, 432,433 on the retina.

Figure 25:
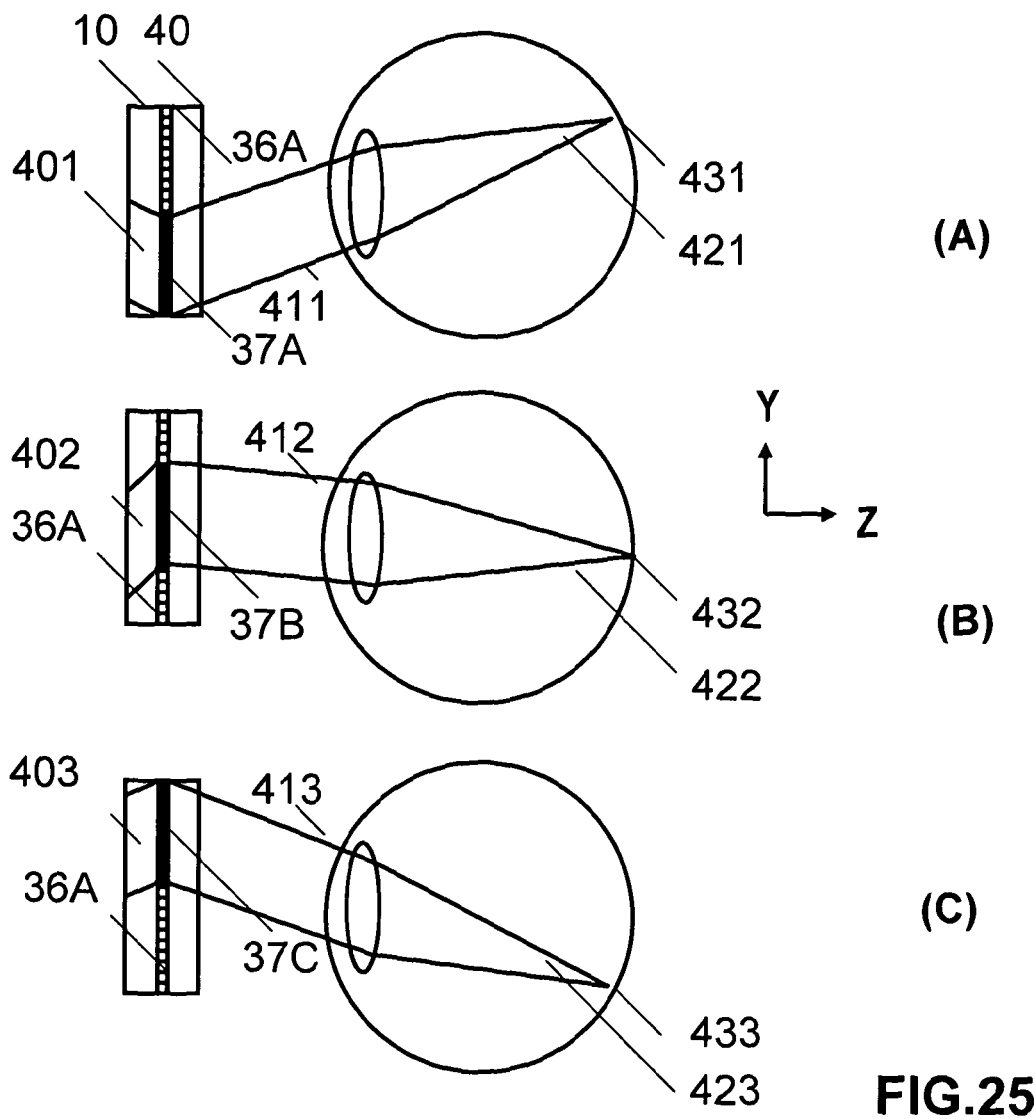
FIG. 25A is an illustration of another embodiment of the invention.
FIG. 25B is an illustration of another embodiment of the invention.
FIG. 25C is an illustration of another embodiment of the invention.

FIG. 25 provides a plan schematic view of three states of the eyepiece. Again considering the SBG row 36A we see that the input TIR beams 401,402,403 are diffracted by active SBG groups indicated by 37A,37B,37C to provide diffracted beams 411,412,413 which are focused on to the retina to provide focal spots 431,432,433. The above process is repeated for each SBG row.

The width of the SBG group 37 may contain around 25% of the cells in the active row. At any instant in time all SBGs in a group have identical index modulation. The total length of the group of active SBG cells roughly matches the diameter of the display exit pupil.

Figure 21:
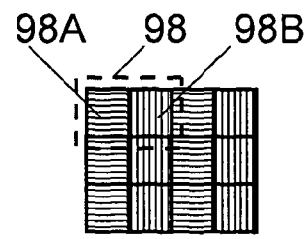
FIG. 21 is an illustration of another embodiment of the invention.

As in the case of the embodiment of FIG. 17 the embodiment of FIG. 21 provides an expanded exit pupil but relying on scrolling rather that simultaneous activation of two dimensional SBG sub-arrays.

It will be clear from consideration of FIG. 23 that the scrolling scheme illustrated in FIG. 21 may operate in either the Y or X directions.

Figure 26:
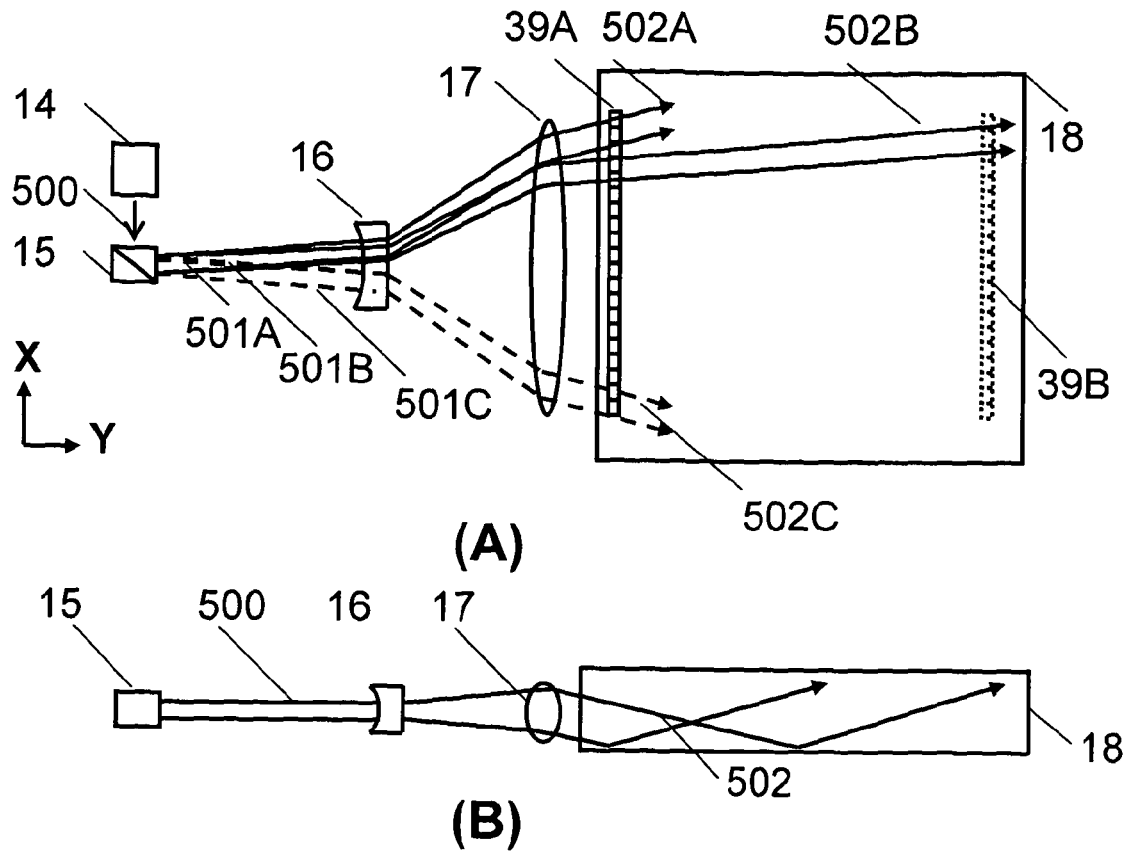
FIG. 26A is an illustration of another embodiment of the invention.
FIG. 26B is an illustration of another embodiment of the invention.

A schematic unfolded plan and side elevation views of the scan optics are provided in FIG. 26. The apparatus comprises a laser source 14, a scanner 15 the scanner angle magnifying lens system comprising the lenses 16 and 17. The front view of the eyepiece and the side view are generally indicated by 18. The laser provides a collimated output beam 500 which is scanned in the XY plane by the scanner 15. Three typical ray paths from the scanner 501A,501B,501C are illustrated which after injection into the eyeglass 18 follow a TIR path 502 and provide the beams indicated by 50-2A,502b,502C. Typically the beam cross sections are matched to the dimension of the SBG cells. The intersection of the scanned beams with SBG cell columns indicated by 39A,39B. The SBG cell prescriptions contain a compensation factor to allow for the variation of the incidence angle between the first and final SBGH column.

Figure 27:
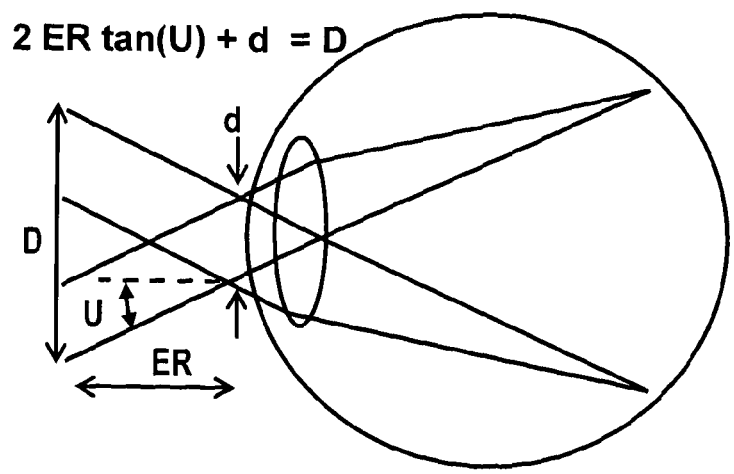
FIG. 27 is an illustration of another embodiment of the invention.

The first-order optical design parameters that apply to the embodiments of FIGS. 17 and 23 are shown in FIG. 27. The parameter comprise: the eye glass dimension; the exit pupil d, which to first order is the same as the dimension of the active SBG cell group; the eye relief ER; and the field of view half-angle U. Said parameters are related by equation: $D=2*ER*\tan(U)+d$.

The invention does not rely on any particular method for introducing light into the eyepiece. The coupling means could comprise a stack of gratings used to transmit red, green and blue light into the display. The gratings may be non switchable gratings. The gratings may be holographic optical elements. The gratings may be switchable gratings. Alternatively, prismatic elements may be used. The invention does not rely on any particular method for coupling light into the display.

The eyepiece may further comprise a layer abutting the substrate 40 for providing optical correction. Said layer may be a diffractive optical element or a hologram. Said layer may be used for the purposes of matching the eyeglasses user's spectacle prescription.

The eyepiece may further comprise a light control film applied to either substrate to block stray light that would otherwise reduce contrast and degrade color gamut. Specifically, the light control film eliminates zero order (or non-diffracted light) and spurious diffracted light arising from the diffraction of more than one wavelength by the SBG cells. Further, the diffraction efficiency versus incidence angle characteristic of transmission gratings will exhibit secondary diffraction maximum to both sides of the primary diffraction peak. While the peak diffraction efficiency of these secondary peaks will be small, the amount of undesired light extracted form the light guide may be sufficient to reduce the color purity of the display. By careful design of the incidence angles at which light is launched and the incidence angles at the display device it is possible to ensure that light from secondary diffraction maxima is absorbed at the light control film. One known means for providing a light control film comprises an array of micro-sphere lenses embedded in a light-absorbing layer. Each lens provides a small effective aperture such that incident rays substantially normal to the screen, are transmitted with low loss as a divergent beam while incident rays incident at an off axis angle, are absorbed. Light control films of this type are manufactured by 3M Inc. (Minnesota). Other methods of providing a light control film, such as louver screens may be used as an alternative to the light control film described above.

With regard to the scrolling scheme illustrate in FIG. 21, it should be understood that other scanning sequences, including scanning multiple color bands, are possible within the scope of the invention. In all cases, the position of the color bands are moved in sequential steps by means of selecting the voltages applied to the SB G array. It should also be understood that the switching of the illumination bands must be done in synchronism with the image modulation of the scanned laser beams. It also must be understood that the entire sequence must be repeated at a sufficient rate that the viewer's eye mergers the sequential single-colored images into a composite full-color image.

The embodiments of the invention have been described in relation to transmission SBGs. One of the known attributes of transmission SBGs is that the LC molecules tend to align normal to the grating fringe planes. The effect of the LC molecule alignment is that transmission SBGs efficiently diffract P polarized light (ie light with the polarization vector in the plane of incidence) but have nearly zero diffraction efficiency for S polarized light (ie light with the polarization vector normal to the plane of incidence. Transmission SBGs may not be used at near-grazing incidence as the diffraction efficiency of any grating for P polarization falls to zero when the included angle between the incident and reflected light is small. A glass light guide in air will propagate light by total internal reflection if the internal incidence angle is greater than about 42 degrees. Thus the invention may be implemented using transmission SBGs if the internal incidence angles are in the range of 42 to about 70 degrees, in which case the light extracted from the light guide by the gratings will be predominantly p-polarized.

In an alternative embodiment of the invention the display device can be implemented using reflection SBGs. Reflection gratings can be configured to have narrow, sharply defined wavelength bandwidth, and are relatively insensitive to variations in angle of the light incident on the grating. The disadvantage of reflection SBG is high operating voltage. While reflection gratings diffract both polarization states when the included angle between the incident and reflected light is small, the diffraction efficiency of any grating for P polarization falls to zero when the included angle between the incident and diffracted beams is 90 degrees. The light diffracted by a reflection grating will be predominantly S-polarized if the angle between the incident and diffracted beams is greater than 70 degrees. Techniques for recording reflection holograms for use with illumination at near-grazing incidence are known in the art and are described in U.S. Pat. No. 6,151,142. In particular, great care must be taken during the hologram recording process to avoid reflections from the ITO electrodes and other internal surfaces within the ESBG devices. Such undesired reflections change the fringe visibility during the hologram recording and may result in objectionable and uncontrollable variations of the grating diffraction efficiency. In addition, the refractive index of the HPLDC material during the hologram recording process must be essentially equal to that of the glass cell.

Embodiments using a Spatial Light Modulator (SLM)

In the embodiments described above and illustrated in FIGS. 17-27. The field of view and exit pupil of the display are expanded by combining an image scanner and an SBG array. Input light is scanned and modulated by a miniature laser scanning device and injected into the eyepiece where it performs TIR until diffracted out of the eyepiece towards the eye by active SBG elements. An equivalent procedure which eliminates the scanner is to project image light from a spatial light modulator into the eyepiece with an SBG array being used to switch portions of the field of view. The SLM may be a liquid crystal display or any other type of two dimensional image display device. An image may be written onto the retina by synchronising the writing of image information to regions of the SLM with the switching of groups of SBG elements as described earlier. Portions of the field of view are sequentially imaged onto the retina by switching groups of SBG elements in sequence and addressing pixels of the SLM to project rays with a predetermined range of incidence angles onto the SBG group while the SBG cells comprising the group are in their active state. The principles of such an embodiment of the invention will now be described in more detail. For the purposes of explanation the switching of monochromatic image light in one dimension only will be considered.

Figure 28:
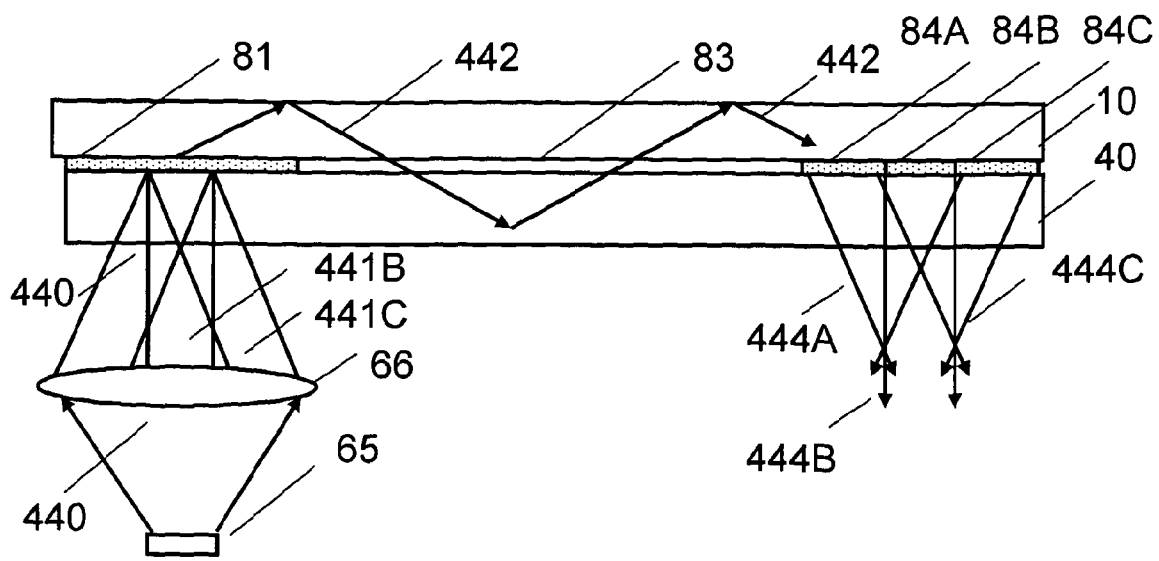
FIG. 28 is an illustration of another embodiment of the invention.

In the embodiment of the invention illustrated in the schematic side elevation view of FIG. 28 an eyepiece according to the principles of the invention comprises an input SBG beam deflector indicated by 81 and an SBG array device comprising a one-dimensional array of independently addressable SBG elements 84A,84B,84C. The SBG beam deflector and the SBG array are separated by a PDLC region 83. The SBG beam deflector and the SBG array are formed in a single layer and sandwiched between transparent substrates 10,40. Advantageously, the ITO layers are applied to the opposing surfaces of the substrates with at least one ITO layer being patterned such that elements of the SBG array may be switched selectively. The substrates and SBG devices together form a light guide. Each SBG array element has a unique optical prescription designed such that input collimated light incident in a first direction is diffracted into output collimated light propagating in a second direction towards the eye. An SBG element exhibits a high diffraction efficiency provided that the incident light rays lie within the angular bandwidth around the Bragg diffraction angle.

Figure 29:
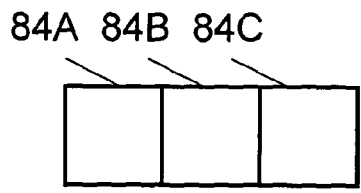
FIG. 29 is an illustration of another embodiment of the invention.
Figure 30:
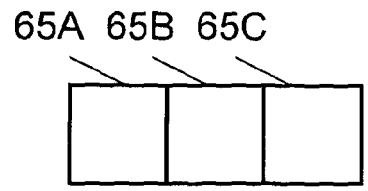
FIG. 30 is an illustration of another embodiment of the invention.

The SLM 65 displays a two dimensional pixelated image which is projected into the light guide by means of the projection lens 66. The SLM is switched to display the horizontally partitioned image regions 65A, 65B,65C in sequence as indicated in FIG. 29. The regions are projected into the light guide by the projection lens which collects light from the SLM generally indicated by the beam 440 to provide the input beams indicated by 441A, 441B,441C. The geometrical optics FIG. 28 has been simplified for the sake of simplifying the description. It should be noted that incident beam 441A, comprises light from an image point at the centre of the image region 65B while the beams 441B,441C comprise light from points symmetrically displaced from the centre centred on the image regions 65a,65C. The SLM may be based on LCD, MEMS or other currently available array technology. The projection optics may include additional lenses to correct optical aberrations. If a reflective SLM device is used it will normally be necessary to provide a polarizing beam splitter to separated the illumination and reflected light. The invention does not assume any particular type of SLM technology or method of implementing a particular SLM technology.

The SBG beam deflector deflects the input beams from the SLM into a TIR path within the light guide. Although all ray paths are generally indicated by the ray 442 in FIG. 28. Each ray direction in the input beams will actually have a unique TIR ray path subject to the usual critical angle constraints imposed by the light guide to air refractive index differential.

The SBG elements 84A,84B,84C are activated in sympathy with the updating of the image regions 65A, 65B,65C of the SLM. In other words when image region 65A is displayed SBG element 84A is in its active state and SBG elements 84B,84C are in their inactive states. When image region 65B is displayed SBG element 84B is in its active state and SBG elements 84A,84C are in their inactive states. Finally, when image region 65C is displayed SBG element 84C is in its active state and SBG elements 84A,84B are in their inactive states. The SBG elements 84A,84B,84C deflect TIR light 442 into the output beams indicated by 444A,44B,444C respectively. As in the case of the input beams the ray geometry of the output beams has been simplified for the purposes of simplifying the description. The output image from the display is viewed through an external pupil of size and location determined by the light path geometry. For perfectly collimated TIR beams the image is formed at infinity. However, it will be clear to those skilled in the art of optics that other viewing distances may be provided by applying a small decollimation to the TIR beams. In many applications this may be achieved by slightly defocusing the collimating optics.

Figure 31:
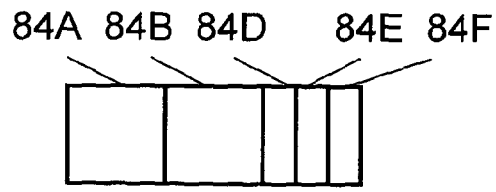
FIG. 31 is an illustration of another embodiment of the invention.

In one embodiment of the invention at least one of the SBG elements may be subdivided into multiplicity of sub elements. For example in the embodiment illustrated in FIG. 31 the SBG element 84C is partitioned into three separately switchable elements 84D,84E,84F.

Figure 32:
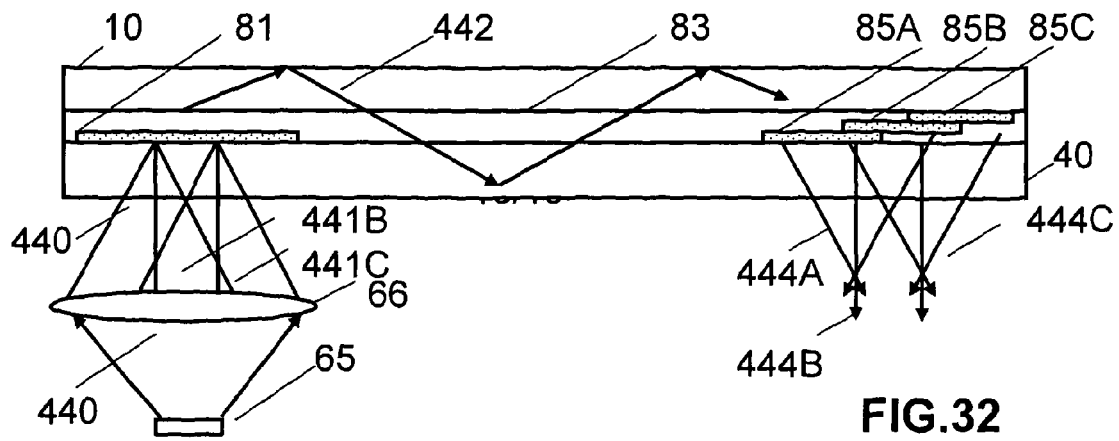
FIG. 32 is an illustration of another embodiment of the invention.

In one embodiment of the invention illustrated in the schematic side elevation view of FIG. 32 the SBG elements 84A, 84B,84C of FIG. 28 are replaced by the stacked SBG elements 85A,85B,85C. Advantageously, the SBG elements may also be staggered as shown in FIG. 32 for optimal control of the output ray geometry.

Figure 33:
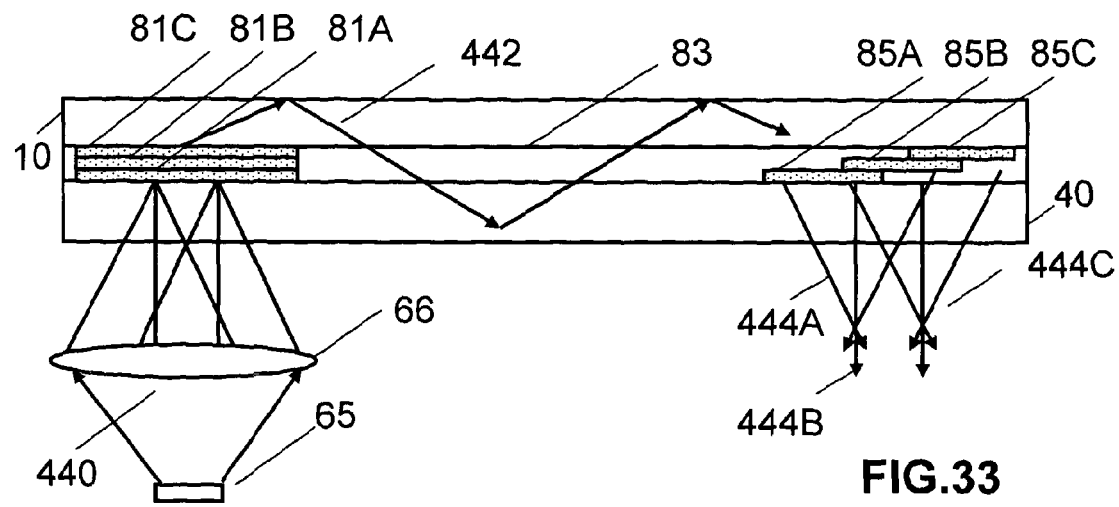
FIG. 33 is an illustration of another embodiment of the invention.

In one embodiment of the invention illustrate in the schematic side elevation view of FIG. 33 the SBG beam deflector comprises a stack of SBGs 81A,81B,81C.

In the embodiment of FIGS. 32-33 it will be clears that each HPDLC layer will be sandwiched between substrates to which transparent electrodes have been applied. In the case of FIG. 33 the beam deflector SBG 81A and the SBG array element 85A are disposed in a first HPDLC layer. Similarly the beam deflector SBG 81B and the SBG array element 85B are disposed in a second HPDLC layer and the beam deflector SBG 81C and the SBG array element 85C are disposed in a third HPDLC layer.

It will be clear from consideration of FIGS. 28-32 that the embodiments illustrated therein may be extended to provide two dimensional switching by adding further SBG elements designed to deflect light in orthogonal directions to the ray paths illustrated in FIGS. 28-32.

It will be clear from consideration of FIGS. 28-32 that the embodiments illustrated therein may be extended to provide colour sequential images by adding providing SBG elements designed to diffract red, green and blue light. Such an embodiment of the invention will increase the number of SBG elements by a factor of three.

Figure 34:
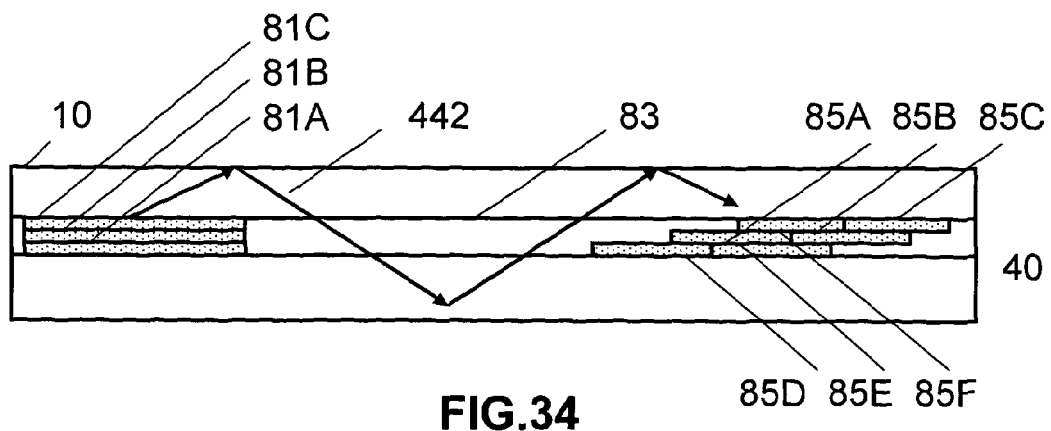
FIG. 34 is an illustration of another embodiment of the invention.

In one embodiment of the invention illustrated in the schematic side elevation view of FIG. 34 the basic principles of the embodiments of FIGS. 28-23 may be combined such the SBG array comprises multiple layers of staggered SBG elements each layer comprising a multiplicity of SBG elements. For example in FIG. 34 the SBG array comprises a first layer comprising the adjacent SBG elements 85A,85D, a second layer comprising the adjacent SBG elements 85B,85E and a third layer comprising the adjacent SBG elements 85C,85F.

It should be noted that the total internal reflection ray paths shown in the drawings are meant to be schematic only. The number of total internal reflections will depend on the scrolling scheme used and the overall geometry of the light guide formed by the display layers. Typically, in order to ensure that TIR occurs the incidence angles must lie in the range of about 42 to about 70 degrees.

With regard to the various illumination directing device embodiments described above, it should be noted that in order to ensure efficient use of the available light and a wide color gamut for the display, the SBG devices should be substantially transparent when a voltage is applied, and preferably should diffract only the intended color without an applied voltage.

It should be emphasized that the drawings are exemplary and that the dimensions have been exaggerated. For example thicknesses of the SBG layers have been greatly exaggerated.

In any of the embodiments of the invention the light sources will desirably be lasers. Exemplary lasers include extended cavity surface emitting laser devices such as those manufactured by Novalux Inc. (CA).

In any of the embodiments of the invention the light sources may be Light Emitting Diodes. Exemplary LEDs include devices based on photonic lattice technology such as those manufactured by Luminus Inc, (CA).

A key feature of all of the embodiments described above is that they provide the benefit of see-through. The latter is of great importance in Head Up Displays for automobile, aviation and other transport applications; private see-through displays such for security sensitive applications; architectural interior signage and many other applications. With the addition of a holographic brightness enhancing film, or other narrow band reflector affixed to one side of the display, the purpose of which is to reflect the display illumination wavelength light only, the see-through display can be made invisible (and hence secure) in the opposite direction of view. Here the reflected display illumination is effectively mirrored and therefore blocked in one direction, making it ideal for transparent desktop display applications in customer or personal interview settings common in bank or financial services settings.

Although the present application addresses wearable displays it will be clear that in any of the above embodiments the eye lens and retina may be replaced by any type of imaging lens and a screen. Any of the above described embodiments of the invention may be used in either directly viewed or virtual image displays. Possible applications range from miniature displays such as those used in viewfinders to large area public information displays. The above described embodiments may be used in applications where a transparent display is required. For example the invention may be used in applications where the displayed imagery is superimposed on a background scene such as heads up displays and teleprompters. The invention may be used to provide a display device that is located at or near to an internal image plane of an optical system. For example any of the above described embodiments may be used to provide a symbolic data display for a camera viewfinder in which symbol data is projected at an intermediate image plane and then magnified by a viewfinder eyepiece. It will be clear the invention may be applied in biocular or monocular displays. The invention may also be used in a stereoscopic wearable display. Any of the above described embodiments of the invention may be used in a rear projection television. The invention may be applied in avionic, industrial and medical displays. There are applications in entertainment, simulation, virtual reality, training systems and sport.

Any of the above-described embodiments using laser illumination may incorporate a despeckler device for eliminating laser speckle disposed at any point in the illumination path from the laser path to the eyeglass. Advantageously, the despeckler is an electro-optic device. Desirable the despeckler is based on a HPDLC device.

In any of the above embodiments the substrates sandwiching the HPDLC layer may be planar, curved or formed from a mosaic of planar or curved facets.

Although the invention has been described in relation to what are presently considered to be the most practical and preferred embodiments, it is to be understood that the invention is not limited to the disclosed arrangements, but rather is intended to cover various modifications and equivalent constructions included within the spirit and scope of the invention.

What is claimed is:

1. A wearable display comprising:
 a spatial light modulator (SLM);
 a means for collimating light emitted from each pixel of the SLM;
 first and second input SBG devices; and
 first and second output SBG devices
 wherein each said SBG device is formed in a HPDLC layer sandwiched between first and second transparent plates;
 wherein each said SBG device is characterised in that it provides a grating in a separate switchable region and is clear elsewhere, wherein said grating has an diffracting state and a non diffracting state,
 wherein said transparent plates and said HPDLC layers form a laminar structure which functions as a light guide;
 wherein said first input SBG device in its diffracting state deflects first wavelength collimated light from said SLM incident in a first angular range into first collimated light following a first TIR path inside said light guide,
 wherein said second input SBG device in its diffracting state deflects first wavelength collimated light from said SLM incident in a second angular range into second collimated light following a second TIR path inside said light guide,
 wherein said first output SBG device in its diffracting state deflects said first TIR path light out of said lightguide providing a first field of view region, wherein said second output SBG device in its diffracting state deflects said second TIR path light out of said lightguide providing a second field of view region, wherein transparent electrodes are applied to the opposing faces of said first and second transparent plates, wherein at least one of said transparent electrode is patterned into independently switchable transparent electrode elements such that said independently switchable transparent electrodes elements overlap said separately switchable grating regions, wherein said first output SBG device in its diffracting state deflects said first TIR path light out of said lightguide in a first direction and said second output SBG device in its diffracting state deflects said second TIR path light out of said lightguide in a second direction orthogonal to said first direction.

2. The wearable display of claim 1, wherein said first input SBG device and said first output SBG device are in their diffracting states, said second input SBG device and said second output SBG device are in their non-diffracting states when said SLM displays a first image, wherein said second input SBG device and said second output SBG device are in their diffracting states, said first input SBG device and said first output SBG device are in their non-diffracting states when said SLM displays a second image.

3. The wearable display of claim 1, wherein said first input SBG device and said first output SBG device are provided by a first HPDLC layer and said second input SBG device and said second output SBG device are provided by a second HPDLC layer.

4. The wearable display of claim 1, wherein said first and second input SBG devices are disposed in a common HPDLC layer.

5. The wearable display of claim 1, wherein said first and second output SBG devices are disposed in a common HPDLC layer.

6. The wearable display of claim 1, wherein said SLM modulates light from a laser.

7. The wearable display of claim 1, wherein said SLM is illuminated by a laser and further comprises a despeckler.

8. The wearable display of claim 1, further comprising:
a means for collimating first wavelength light emitted from each pixel of the SLM;
a third input SBG device; and
a third output SBG device,
wherein said third input SBG device in its diffracting state deflects collimated light from said SLM incident in a third angular range into second collimated light following a third TIR path inside said light guide and, wherein said third output SBG device in its diffracting state deflects said third TIR path light out of said lightguide providing a third field of view region.

9. The wearable display of claim 1, further comprising:
first and second second-wavelength-diffracting input SBG devices; and
first and second second-wavelength-diffracting output SBG devices,
wherein said first input second-wavelength-diffracting SBG device in its diffracting state deflects second wavelength collimated light from said SLM incident in said first angular range into a first second-wavelength-light TIR path inside said light guide,
wherein said second input second-wavelength-diffracting SBG device in its diffracting state deflects second wavelength collimated light from said SLM incident in said a second angular range into a second second-wavelength-light TIR path inside said light guide,
wherein said first output second-wavelength-diffracting SBG device in its diffracting state deflects said first second-wavelength-light TIR path light out of said lightguide into said first field of view region,
wherein said second output second-wavelength-diffracting SBG device in its diffracting state deflects said second second-wavelength-light TIR path light out of said lightguide into said second field of view region.

10. The wearable display of claim 1, wherein said first input SBG device and said first output SBG device are in their diffracting states when said second input SBG device and said second output SBG device are in their non-diffracting states.

11. The wearable display of claim 1, wherein said SBG device is in said non-diffracting state when an electric field is applied across said electrodes and switches to said diffracting state when said electric field is removed.

12. The wearable display of claim 1, wherein said first and second field of view regions substantially abut.

13. The wearable display of claim 1, wherein said first direction is characterized by a ray direction corresponding to the centre of said first field of view region and said second direction is characterized by a ray direction corresponding to the centre of said second field of view region.

14. The wearable display of claim 1, wherein said first direction is characterized by the direction of deflection of said first TIR light by said first output SBG device and said second direction is characterized by the direction of deflection of said second TIR light by said second first output SBG device.

* * * * *